H. E. GOLDBERG (NOW BY JUDICIAL CHANGE OF NAME H. GOLBER).
CALCULATING MACHINE.
APPLICATION FILED MAY 28, 1904.

1,380,792.

Patented June 7, 1921.
7 SHEETS—SHEET 1.

WITNESSES:

Hyman Eli Goldberg,
INVENTOR.
BY Howard M. Cox
ATTORNEY.

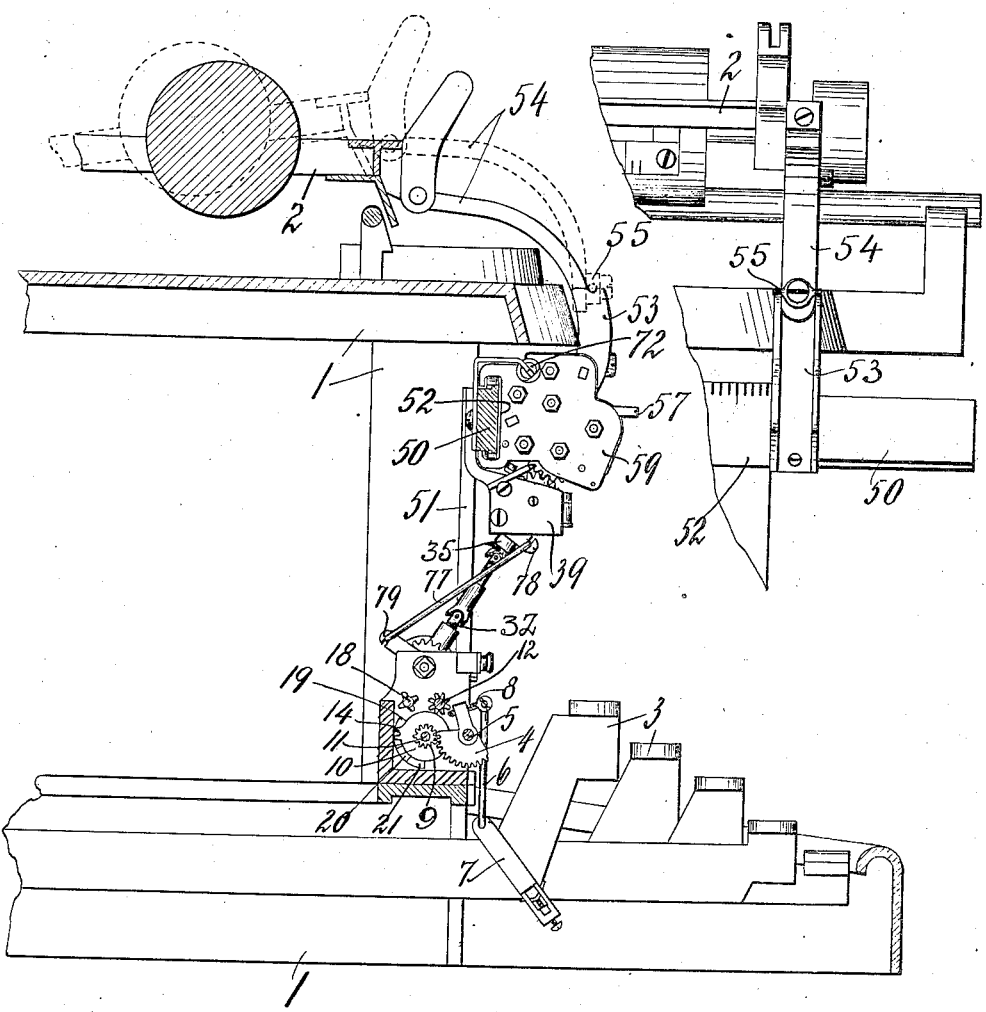

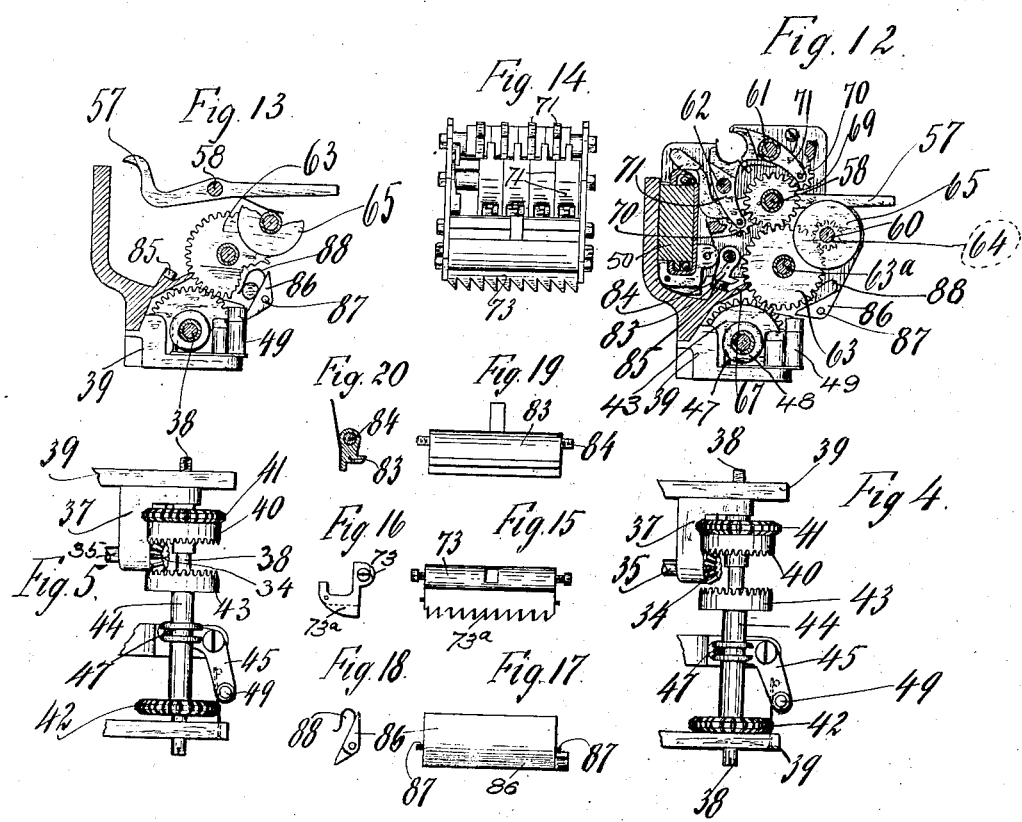

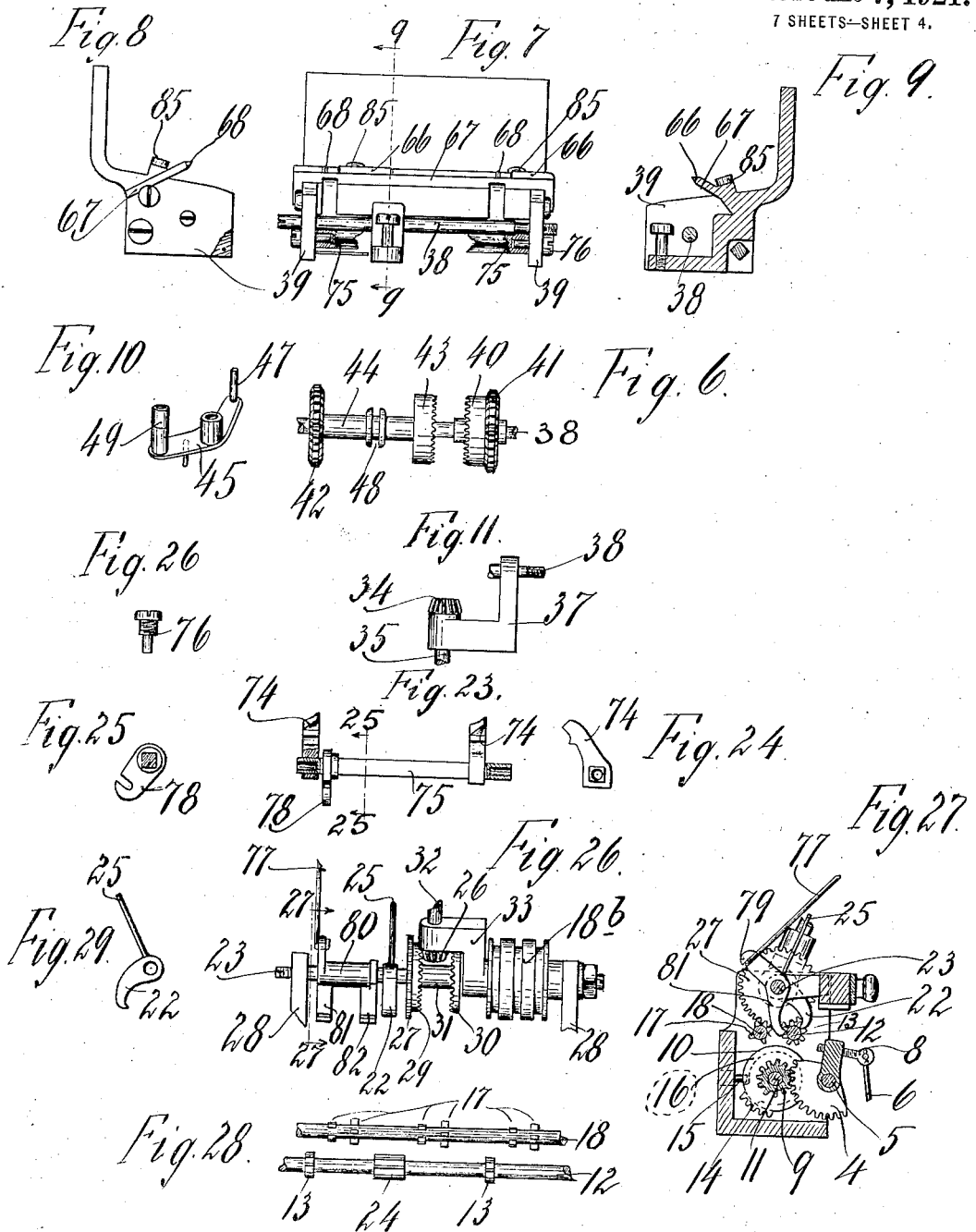

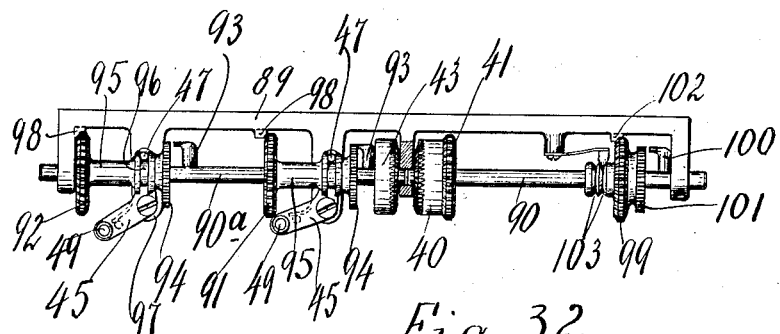
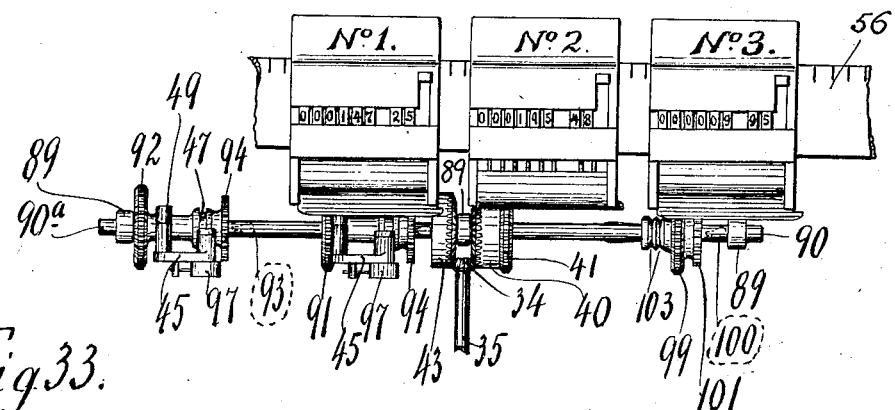
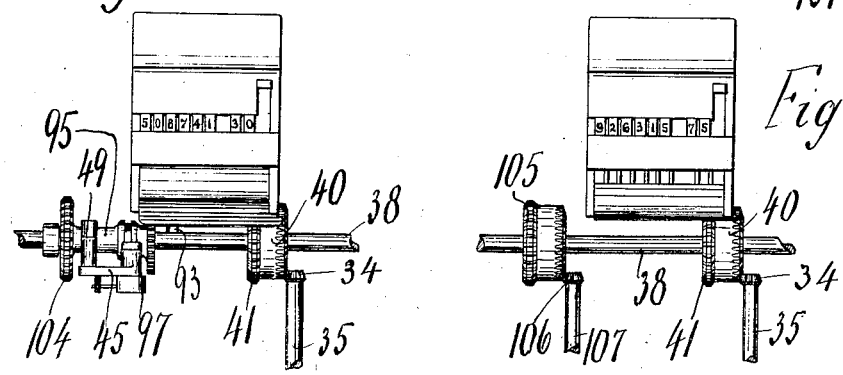

H. E. GOLDBERG (NOW BY JUDICIAL CHANGE OF NAME H. GOLBER).
CALCULATING MACHINE.
APPLICATION FILED MAY 28, 1904.

1,380,792.

Patented June 7, 1921.
7 SHEETS—SHEET 6.

Witnesses
Harry R. White
Ray White

Inventor:
Hyman Eli Goldberg.
By Howard M. Cox
Atty.

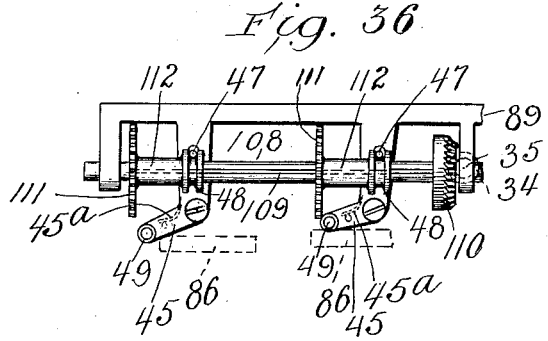
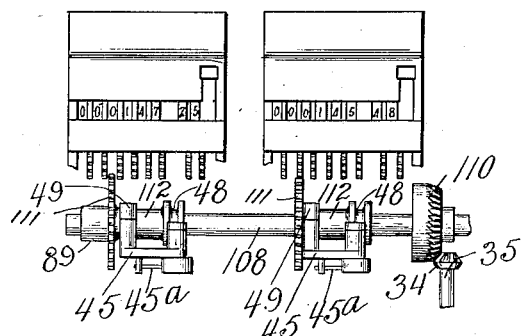
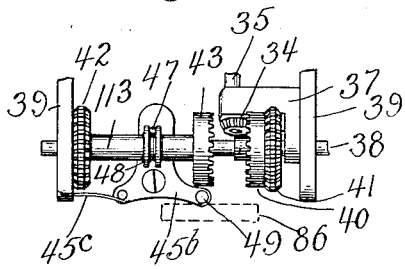
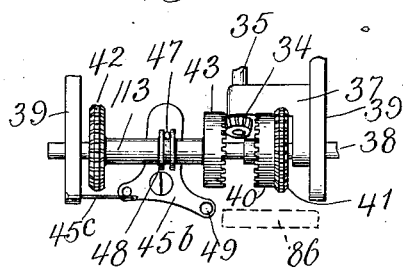

UNITED STATES PATENT OFFICE.

HYMAN ELI GOLDBERG, (NOW BY JUDICIAL CHANGE OF NAME HYMAN GOLBER,) OF CHICAGO, ILLINOIS, ASSIGNOR, BY MESNE ASSIGNMENTS, TO REMINGTON ACCOUNTING MACHINE CORPORATION, OF NEW YORK, N. Y., A CORPORATION OF NEW YORK.

CALCULATING-MACHINE.

1,380,792.   Specification of Letters Patent.   Patented June 7, 1921.

Application filed May 28, 1904. Serial No. 210,158.

*To all whom it may concern:*

Be it known that I, HYMAN ELI GOLDBERG, a citizen of the United States, residing at the city of Chicago, in the county of Cook and State of Illinois, have invented a certain new and useful Improvement in Calculating-Machines, of which the following is a specification.

My invention relates to calculating machines and to calculating attachments to typewriters; and among other features embodies improvements applicable to mechanism such as I have described in the patent issued to me February 14, 1905, No. 782,554. There is also comprised in this present machine, parts of the mechanism shown and described in the patent issued to me October 20, 1903, No. 741,961.

This invention has for its objects the following considerations:

First, as to safeguards. In the operation of some calculating machines, it sometimes happens that a key is depressed partially, but not to the completion of its stroke. It is one of the objects of this invention to call attention to such incomplete strokes by providing means for preventing the return of such key unless it is completely depressed. Should the key have been the proper one, but not have been completely depressed, then the operator may complete the depression; but should it have been a wrong key, struck by error, mechanism is provided for releasing the key and returning everything to prior position without registering.

Second, it is sometimes desirable to be able to operate the calculating parts without doing any printing, and it has been another object of my invention to provide means whereby the parts may be operated in the usual manner without doing any printing.

Third. Again as to safeguards, if it happens that a key is pushed only part way down, and the escapement of the typewriter be not in good condition, there is a tendency on the part of the carriage to shift forward before the rotation of said setting wheel has been completed. Another of the objects of my invention is to provide means for preventing the movement of the typewriter carriage until the key has been sufficiently depressed to completely operate the calculating parts.

The fourth one of the chief objects of the invention is to render the machine more flexible and universally useful in the making out and computing of bills and accounts, as will be hereinafter more completely illustrated by means of concrete examples.

I attain these objects by the mechanism illustrated in the accompanying drawings, in which—

Fig. 2 is a side view of the calculating parts attached to a typewriter, the typewriter being shown in vertical section.

Fig. 3 is a fragmentary front view and illustrates the means for holding the carriage in a raised position for temporarily preventing printing.

Figs. 4 and 5 are plan views showing the relation of the main setting wheel, the driving pinion, the auxiliary setting wheel and connected parts. In Fig. 4 the auxiliary setting wheel is shown in normal position out of operative connection with setting pinion, and in Fig. 5 the auxiliary setting wheel is shown in operative connection with setting pinion.

Fig. 6 is a front view of the main and auxiliary setting wheels mounted upon their common axle.

Fig. 7 is a front view of the framework which carries the locking plate, the setting wheels and connected parts.

Fig. 8 is a side view looking at the left side of the parts shown in Fig. 7.

Fig. 9 is a sectional view on the line 9—9, Fig. 7.

Fig. 10 is a perspective view of the rocking arm which shifts the companion setting wheel shown in Figs. 4, 5 and 6.

Fig. 11 is a fragmentary view showing a portion of the frame wherein are supported the setting pinion and the axle whereon the setting wheels are mounted.

Fig. 12 is a sectional view taken transversely through the box or receiving mechanism and also shows the mechanism for operating the auxiliary setting wheel and the manner of supporting the receiving mechanism upon the fixed guide bar.

Fig. 13 shows some of the parts illustrated in Fig. 12. In Fig. 12 the cam for operating the shifting mechanism of the auxiliary setting wheel is shown to be set in a non-operative position while in Fig. 13 said cam is shown in operative position.

Fig. 14 is a rear view of the receiving mechanism showing the ratchet piece in position therein.

Figs. 15 and 16 are front and end views respectively of said ratchet piece.

Figs. 17 and 18 are face and end views respectively of the cam for shifting the auxiliary setting wheel.

Figs. 19 and 20 are face and transverse sectional views respectively of the member for locking the receiving wheels.

Figs. 21 and 22 are side views in sectional elevation showing the member for locking the setting wheels. In Fig. 21 said wheels are shown to be locked and in Fig. 22 unlocked.

Fig. 23 is a face view of the rock shaft carrying the locking member shown in Figs. 21 and 22.

Fig. 24 is a view of the right side of the pawls shown in Fig. 23.

Fig. 25 is a sectional view on the line 25—25, Fig. 23 showing the operating arm.

Fig. 26 is a face view of the parts for operating the setting pinion located at the lower extremity of the setting shaft.

Fig. 27 is a sectional view taken on line 27—27, Fig. 26, showing the parts of Fig. 26 and parts immediately below.

Fig. 28 is a view in plan showing the relative positions of the pinion shaft and locking shaft shown in section in Fig. 27, and also showing when taken in connection with Fig. 26, the lateral relation of the parts.

Fig. 29 is a view of the hand operated detent.

Fig. 30 shows the controlling bar whereby the rocking frames are oscillated about their axles. In the form here shown said bar is modified so as to be adapted to the use of two setting wheels.

Fig. 31 is a plan view of a setting mechanism embracing four setting wheels.

Fig. 32 is a front view of the same showing three receiving mechanisms in operative connection therewith.

Fig. 33 is a front view of a receiving mechanism and two setting wheels for illustrating the action of a non-reversible machine.

Fig. 34 is a front view of another mechanism also adapted for a non-reversible machine.

Figs. 36 and 37 are plan and front views respectively illustrating a modification in the manner of controlling the auxiliary setting wheels so as to render them operative or non-operative on the receiving mechanism.

Figs. 38 and 39 are plan views showing another modification in the manner of controlling the auxiliary setting wheels so as to render them operative or non-operative on the receiving mechanism.

Similar numerals denote similar parts throughout the several views; and reference will first be made to the parts shown in Figs. 1 to 29 inclusive.

Figure 1:
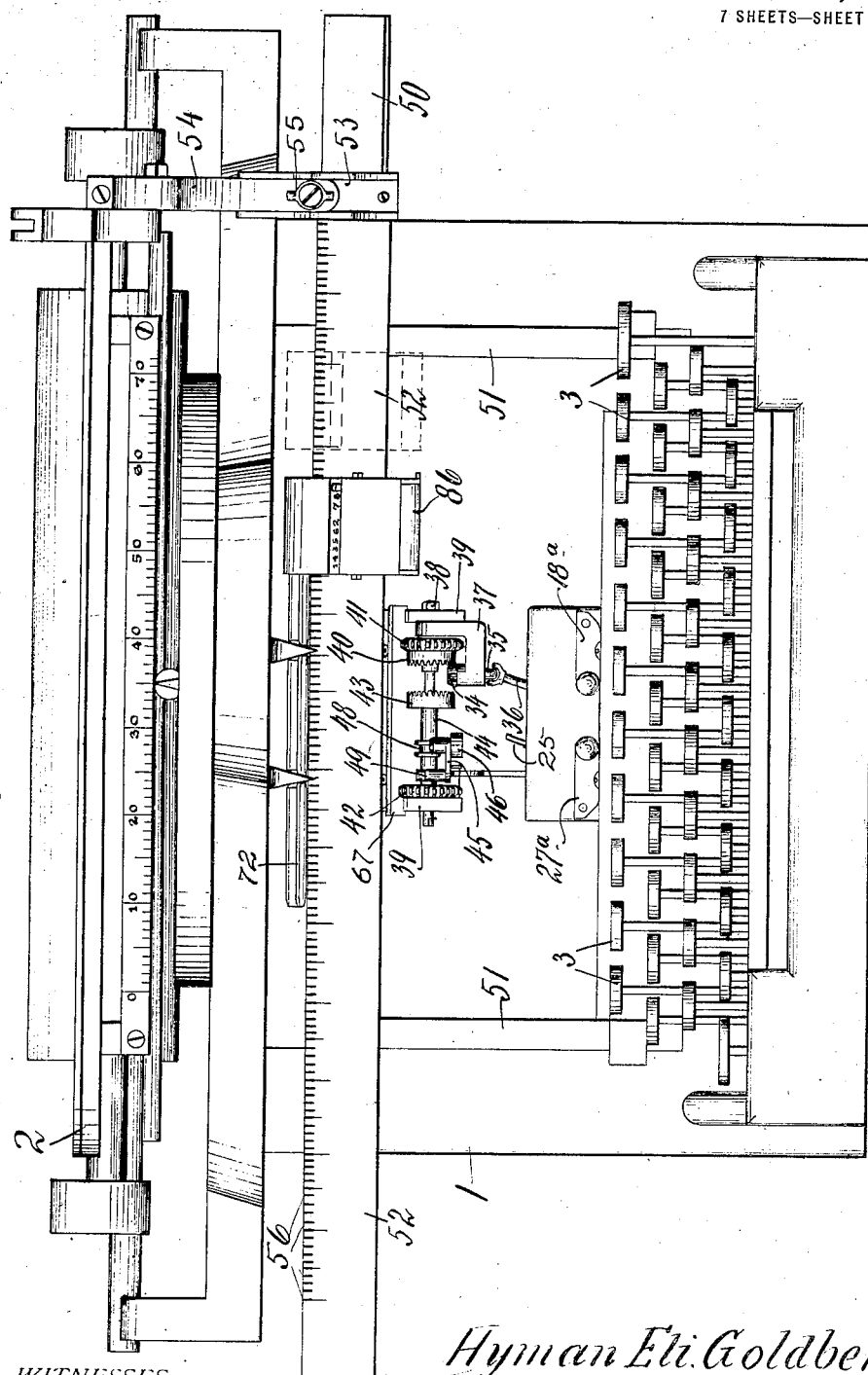
Figure 1 is a general front view of the assembled machine.
Figure 35:
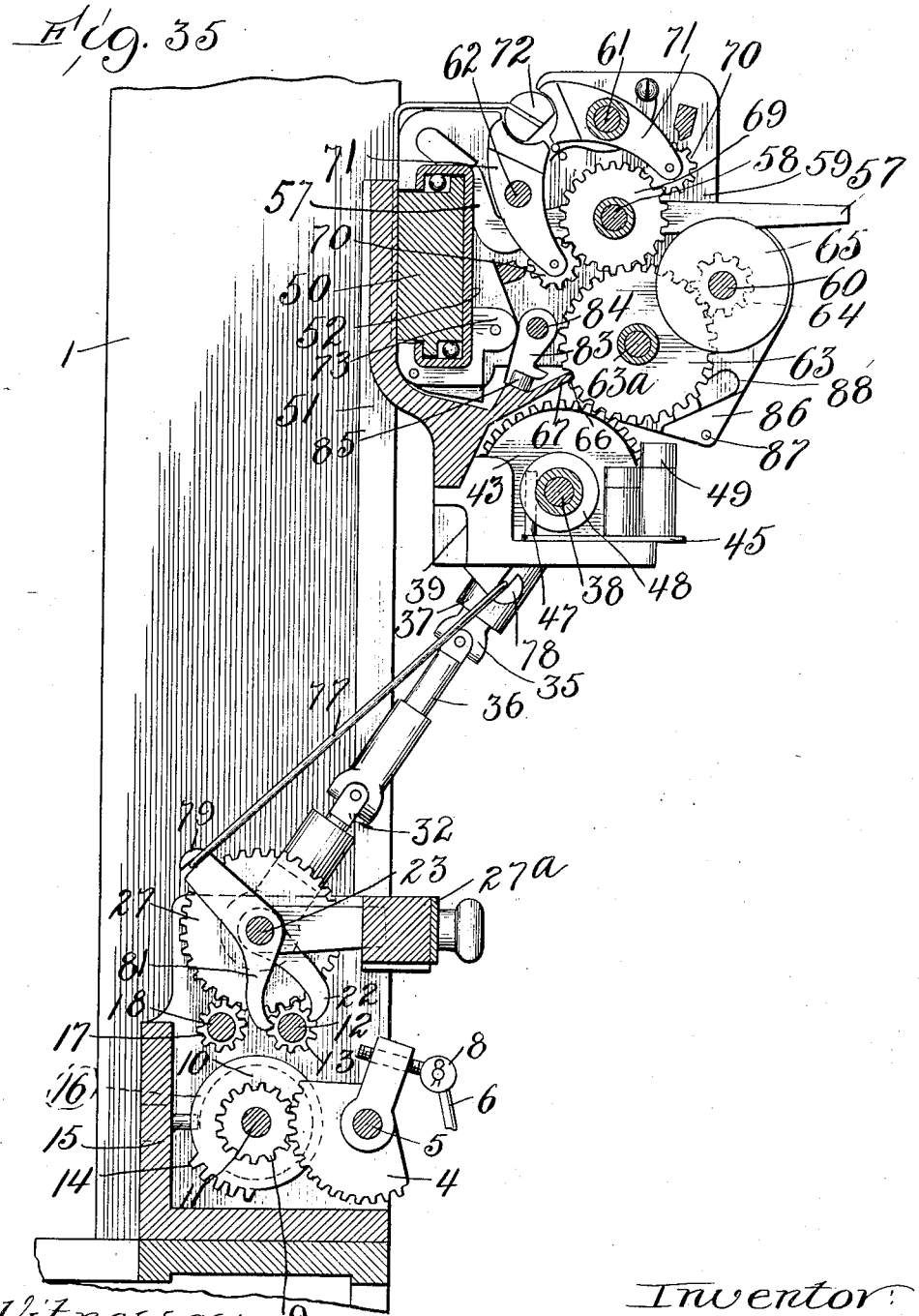
Fig. 35 is an assembly view drawn to an increased scale, and is taken in vertical section through the number setting mechanism and receiving mechanism.

The typewriter in the form here shown, comprises the framework 1; the carriage 2, which is laterally shiftable thereon; and the keys 3. (Figs. 1 and 2.) The driving sectors 4 (Figs. 2 and 27) are caused to oscillate back and forth upon their fixed shaft 5 by means of the links 6, which connect the key riders 7 with the screw eyes 8 in said sectors. The precise manner of mounting the sectors 4 and connecting them to the keys, is immaterial, the purpose being to provide means for rotating the sectors back and forth to correspond in a positive manner to the motion of the respective keys. Said sectors 4 are provided with gear teeth adapted to mesh with the gear wheels 9 located at the side and forming a part of the digit pieces 10. Said digit pieces are independently revoluble and independently shiftable upon the fixed shaft 11 and are designed to operate the digit pinion shaft 12. The teeth of gears 9 are wide faced so that each gear is in mesh with its sector, no matter in what position the gear may be.

On shaft 12 (shown separately in Fig. 28) are rigidly fixed the digit pinions 13, one for each of the digit pieces 10; and said digit pieces are provided with gear portions 14 for rotating said digit pinions, the number of teeth in any given gear portion depending upon the numerical value of its digit piece. The lateral shifting of the digit pieces upon shaft 11 is accomplished by means of the fixed pins 15 adapted to enter into the cam grooves 16 in said digit pieces. The digit pieces 10 are also designed to operate the locking pinions 17 which are rigidly fixed upon the locking shaft 18 and are arranged in pairs thereon, one pair for each of said digit pieces. The operation of shaft 18 by digit pieces 10 is accomplished by means of the locking disk sectors 19, 20 and 21, which form a part of said digit pieces and are adapted to coöperate with said pinions 17.

The above mentioned parts have been fully described in my Patent No. 782,554, and it is sufficient for the present purpose to state that the parts are so arranged that when a key is depressed, the gear portion 14 will drive the digit pinion 13 to rotate shaft 12, and that after the driving action of the gear portion 14 is completed, the digit pieces 10 will, by reason of the action of their cam grooves on the pins 15, be shifted sidewise to bring the gear portions 14 out of line with the digit pinions and the locking disk sectors 19, 20 and 21 out of line with the locking pinions 17. In the meantime, however, said disk sectors will have alternately locked and rotated the locking shaft 18.

As the gear portions 14 do not disengage the digit pinions 13 until their driving action on the former is completed, it follows that if a key is not depressed far enough to complete the rotative action of the parts, the rising of the key will return the parts to the prior position and nothing will be registered. But in order to specially call the attention of the operator to the fact that an attempted key stroke has been incomplete, means are provided for automatically holding the key in its partially depressed position until it is subsequently released by hand. This is accomplished by means of the weighted pawl 22 (best shown in Figs. 26, 27 and 29) which is pivoted upon the fixed shaft 23, and so arranged and constructed that it permits the pinion 24 (which is rigidly fixed on shaft 12) to rotate in the positive direction but prevents rotation in the return direction. The preventing of the return rotation of the pinion 24 and shaft 12 will prevent the rising of the key because of the fact that the key is positively connected by means of the stiff link 6 to its sector 4, and said sector is (prior to the completion of the proper amount of rotation of pinion 24) still in positive geared connection with said pinion. This calls the attention of the operator to the incomplete depression of the key, and he then has the choice of completing the depression of the key or of releasing the key and returning everything to the prior position without having registered anything. This latter he would do by throwing back the retaining pawl 22 against the force of its weight, and in order that this may be done conveniently, said pawl is provided with a handle 25.

Pinion 24 in the ordinary operation of the machine, rotates always in the same direction and its amount of rotation depends upon the value of the key struck; it is suitable, therefore, for setting up the digits. The motion of said pinion may be transmitted to the setting pinion 26 in any suitable manner, but the form here shown is preferred and is similar to the one shown in my Patent No. 782,554 above referred to. The rotatable and shiftable toothed gear 27 is mounted on the shaft 23 fixed in the stationary walls or plates 28, 28, and meshes with the pinion 24 on shaft 12. (Figs. 26 and 27.) The width of pinion 24 is such that it will remain in mesh with wheel 27 for all positions of the latter. There is no theoretical significance in the fact that the gear 27 and pawl 22 are mounted on the same shaft, nor that they coöperate with the same pinion 24, these being merely matters of convenience.

The gear 27 is here formed of a single piece with the bevel gears 29 and 30 and with the hub 31 which is rotatably and slidingly mounted on said shaft 23. Said bevel gears are so arranged that either may be shifted into mesh with the pinion 26 which is rigidly secured to the shaft 32 mounted in the bracket 33. Said bracket is so mounted upon the shaft 23 as to hold the setting pinion laterally immovable and it is evident, therefore, that the direction in which said pinion will be rotated by pinion 24 will depend upon which one of the two bevel gears is in mesh with said setting pinion. This mechanism constitutes a reversing gear whereby the machine may be set either in condition to add or to subtract, by shifting one or the other of the bevel gears into active connection with the pinion 26. This is here accomplished by means of the reversing lever $27^a$ which may be connected to gear wheel 27 in any suitable manner, such, for example, as the one shown and described in the above mentioned Patent No. 782,554.

At times it may be desirable to throw the calculating mechanism out of connection with the printing mechanism. This is here accomplished in the same manner as in my said Patent No. 782,554, shafts 12 and 18 being made shiftable and controlled by means of the disconnecting lever $18^a$ suitably connected to the shifter $18^b$, which shifter is grooved to engage pinions 13 and 17.

The setting pinion 26 may be connected to the bevel pinion 34 in any suitable manner, as by means of a Hookes joint or gimbal comprising the shafts 32 and 35, and the connecting shaft 36. (Figs. 1, 2, 4, 5, 26, 27 and 35.) The purpose of employing a gimbal is to provide universal connections so that when the machines take the form of a typewriter attachment the different portions of the machine may be readily adapted to typewriters of different styles and makes. As long as the axes of the shafts 32 and 35 are parallel, their rotation will be mathematically equal, but a slight variation from the parallel may be had without rendering the mechanism inoperative.

The shaft 35, to which the bevel pinion 34 is rigidly attached, is journaled in the laterally fixed bracket 37. (Figs. 1 and 11.) Said bracket is supported on the shaft 38 fixed in the stationary frame pieces 39, 39; and the bracket may, if necessary, be swung to different positions in adapting the calculating parts to a typewriter. The bevel pinion 34 is adapted to mesh at all times with the bevel gear 40 which drives, and is preferably formed of a single piece with the setting wheel 41. Said parts 40 and 41 (Figs. 1, 4, 5 and 6) are rotatable upon shaft 38 and are confined thereon so as to be laterally immovable.

I will now describe a very important part of the mechanism, to wit, the auxiliary setting device which is one of the devices whereby I am enabled to accomplish the results suggested by the examples hereinafter given.

At the side of the main setting wheel 41, and preferably on the same shaft, is mounted the auxiliary setting wheel 42 which like the main setting wheel is a spur gear wheel with the faces of its teeth lying parallel to the direction of travel of the carriage. (Figs. 1, 4, 5 and 6.) Said auxiliary wheel 42 and the bevel gear 43 both move as a single piece with and are desirably an integral part of the hub or sleeve 44 which is rotatable and laterally shiftable upon shaft 38. The bevel gear 43 is similar to the bevel gear 40 and is adapted to be shifted along shaft 23 into and out of engagement with the bevel pinion 34. As bevel gears 43 and 40 engage pinion 34 on opposite sides, the setting wheels will be driven in opposite directions.

The sleeve 44 and parts thereon are shifted laterally by means of the lever 45 (Figs. 1, 4, 5 and 10) which is pivotally supported on the stationary bracket 46 and has a pin 47 adapted to be engaged within the circumferential groove or channel 48 in said sleeve. Said lever is spring influenced so as to tend to hold bevel gear 43 out of engagement with pinion 34, and is provided with a second pin 49 whereby the lever may be operated to shift the said bevel gear into engagement with pinion 34. The operating of said lever is automatically accomplished by the movement past it of the receiving mechanism in a manner hereinafter described, but first there will be described the means whereby the receiving mechanism is supported.

The frame pieces 39 hereinabove mentioned are in the present case, attached to the stationary guide bar 50 (Figs. 1, 2 and 12) carried upon the stationary parts 51, 51. Said guide bar lies parallel to the direction of motion of the typewriter carriage and is adapted to carry the slide 52 which consists of a bar slidingly mounted on guide 50 and adapted to carry one or more receiving mechanisms. Said slide is caused to move laterally with the typewriter carriage by means of a keeper 53 (Figs. 1, 2 and 3) which is fixed to said slide 52 and is provided with side walls for engaging the lower portion of an arm 54 which depends from the said carriage. In the style of typewriter here shown, the carriage which is adapted to carry the paper, may be raised for various purposes, and when it is so raised, the type cannot reach the paper and no impression will be made upon the paper.

In order that, if desired, the paper may be held up out of reach of the type, during the operation of the calculating parts and the shifting movement of the carriage, there is provided near the lower extremity of arms 54 a pivoted bar 55 which when swung crosswise of arm 54 will rest upon the top of the walls of keeper 53 and will hold arm 54 and carriage 2 in a sufficiently elevated position to be out of reach of the type. Even when arm 54 is thus elevated, as shown in Fig. 3, its lower extremity below bar 55 will project part way into keeper 53 so that the shifting motion of the carriage will be transmitted to the slide 52. When bar 55 is lengthwise of arm 54, it lies out of contact with the walls of the keeper 53, but the construction is such that in neither position of bar 55 will said bar or the arm 54 prevent the carriage from being raised higher.

The slide has a series of notches 56 for receiving an extremity of the detent 57 which is pivoted on the shaft 58 of the receiving mechanism and permits the receiving mechanism to be set at any desired point along said slide. Said notches are located one type space apart.

The general construction and theory of operation of the receiving mechanism is substantially the same as described in my Patent Number 741,961, and a brief description will therefore be sufficient for the present purpose.

The walls 59, 59, of the receiving mechanism are mounted so as to be laterally adjustable on slide 52, and are held at a fixed distance apart by suitable means, such for example as the rods or shafts 60, 61 and 62, in addition to the shaft 58 above mentioned.

The receiving wheels 63 are mounted upon shaft 63$^a$ so as to be independently rotatable thereon, but not shiftable thereon, and they are located at a distance apart equal to one complete step of the typewriter carriage. The receiving wheels are so placed that they will be brought into mesh with a setting wheel one after the other; that is to say, the escapement of the typewriter carriage one full type space will bring the next adjacent receiving wheel into mesh with said setting wheel. The number of the receiving wheels determines the value of the highest number which can be shown on the receiving mechanism and there is a figure wheel for each of said receiving wheels. The wheels 63 mesh with the gear wheels 64, one of said wheels 64 being secured to each of the figure wheels 65 for rotating the latter. Said figure wheels are independently rotatable upon shaft 60, but are prevented from sliding laterally thereon.

In order that each receiving wheel 63 may be alined and locked prior to the time when it comes into mesh with the setting wheel 41 or setting wheel 42, two fins 66 are provided on the stationary plate 67, as best shown in Figs. 7 and 12. Said fins engage the teeth of said receiving wheels and lock the same during the time when said receiving wheels are opposite said fins. The fins lie to the right of the setting wheels and terminate at points such that any given receiving wheel is released from the fin just before coming into mesh with the setting wheel. By this construction the receiving wheels are locked by the fins until they are engaged by the setting wheels. In order to avoid looseness or backlash in the gearing, and to complete the effect of the setting wheels 41 and 42, said receiving wheels are alined or corrected after leaving said setting wheels by means of the pins 68, which are adapted to engage the receiving wheels momentarily as they leave the setting wheels. Said pins 68 extend only a short length, however, so that any given receiving wheel becomes disengaged therefrom by the time the next succeeding receiving wheel comes into mesh with the setting wheel.

As the travel of the receiving mechanism is coextensive with the travel of the typewriter carriage, said receiving mechanism is, during a considerable portion of its travel, not in position to be locked by the plate 67 and pin 68. In order that the receiving mechanism may be locked when away from plate 67 and pin 68, a swinging locking piece 83 (Figs. 12, 19 and 20) is pivotally mounted on the shaft 84 fixed in the walls 59 of the receiving mechanism. Said locking piece 83 extends the full width of the receiving mechanism and is spring influenced so as to normally lock all of the receiving wheels 63. Said locking piece is forced out of engagement with wheels 63 by reason of contact with the pins 85, which contact occurs at the same time that the receiving wheels pass the setting wheels.

The tens-carrying mechanism and also the receiving wheels and figure wheels just mentioned are here shown in the same form as in my Patent 741,961, and need not here be described in detail, especially as my present invention is not concerned with the tens-carrying devices; for any tens-carrying mechanism may be substituted in the receiving mechanism without departing from the spirit of my invention. In this, the preferred form, the tens-carrying wheels 69 are loosely mounted upon the shaft 58 (Figs. 12 and 13) so as to be independently revoluble but not laterally shiftable thereon. Said wheels 69 each mesh with one of the receiving wheels 63 and are adapted to be engaged in pairs by the tens-carrying pinions 70 mounted in the rocking frames 71. Said frames are pivotally mounted on the shafts 61 and 62 and the movement of said frames to bring pinions 70 into or out of mesh with the wheels 69 is governed by the configuration of stationary controlling bar 72 at the particular point where any given rocking frame temporarily makes contact with it. In the form shown in Fig. 30, the bar is of uniform cross section except at the points 72$^a$, 72$^a$, where there is a depression on one side of the bar and a projection upon the other side. The purpose is to bring the carrying pinions into mesh with such carrying wheel as is momentarily in mesh with the setting wheel and the ones to the left thereof. This makes a locked counting mechanism of the carrying wheels to the left but leaves undisturbed the carrying wheels to the right of the setting wheel. It will be noted that in this, the preferred form, all connections between the receiving wheels and the figure wheels are toothed gears which will operate backward as well as forward. In other words, the receiving mechanism is reversible and will either add or subtract, depending upon the direction in which the receiving wheels are rotated.

I will now describe mechanism for preventing premature shifting of the receiving mechanism which, if permitted to occur, would throw the receiving wheel 63 out of mesh with the setting wheel before the rotation of a receiving wheel became complete. The escape piece 73 (Figs. 12, 13, 15, 16, 21 and 22) is rigidly secured to the receiving mechanism and has a series of teeth 73$^a$ for receiving and retaining an extremity of the locking and retaining pawls 74. Said pawls are rigidly secured upon the rock shaft 75 which is pivoted to the stationary frame pieces 39, by means of the pivot screws 76. Said pawls 74 are provided with teeth for engaging the teeth of the setting wheels 41 and 42, and the parts are so arranged that when the pawls 74 are in engagement with the wheels 41 and 42, said pawls will be free from the pieces 73, but when said pawls 74 are thrown out of engagement with wheels 41 and 42, they will enter between the teeth of said stop piece and thereby prevent the shifting of the receiving mechanism and of the typewriter carriage. In other words, the parts are so arranged that the shifting of the receiving mechanism and the rotation of a setting wheel cannot occur at the same time.

The pawls 74 are normally held in mesh with the setting wheels by means of the rod 77 which engage the notched extremity of the arm 78 (Figs. 2, 21, 22, 23, 25, 26 and 27) rigidly secured to rock shaft 75. Said rod 77 is connected at its lower extremity to the notched extremity of the arm 79 which forms preferably an integral part of the rocking sleeve 80 pivotally mounted upon the shaft 23. Two other arms, 81 and 82, are also rigidly secured to or formed upon rocking sleeve 80. The arm 81 is adapted to enter between the teeth of one of the digit pinions 13, and is so formed that when said pinion and the shaft 12 upon which it is formed, commences to rotate, said arm 81 will be forced out of contact with said pinion. This forcing back of arm 81 causes the sleeve 80 to rock in such direction as to release the rod 77 and permit the levers 74 to release the setting wheels and enter into engagement with the teeth of the escape piece 73, the rotation of a setting wheel forcing the pawl 74 away from said setting wheel and therefore into engagement with the stop piece 73. This serves to prevent the shifting of the receiving mechanism. The parts would remain in this condition, were it not that after the rotation of the digit pinion 13 is completed, the arm 82 which is adapted to be engaged by one of the locking pinions 17, will be thrown by one of said pinions in a direction to swing arm 81 back again into engagement with pinion 13, and therefore by means of link 77 also swing pawl 74 back again out of engagement with the stop piece 73 and into engagement with said setting wheel. This simultaneously releases the receiving mechanism and permits it to shift. As pointed out in my Patent No. 782,554 above referred to, the shafts 12 and 18 are so timed that shaft 18 and pinion 17 thereon will rotate immediately before the commencement and immediately after the completion of the rotation of the digit pinion 13, and advantage is taken of this fact to cause pinion 17 to release arm 82 just prior to the rotation of digit pinion 13 and replace said arm 82 immediately after the rotation of pinion 13. It follows, therefore, that pawls 74 will remain in engagement with the teeth of the escape piece 73 during the entire period of rotation of the digit pinions and setting wheels, thereby preventing premature escape of the receiving wheels from the setting wheel.

The mechanism for accomplishing the first three objects mentioned at the beginning of this specification have now been described. There will now be described mechanism for rendering the machine capable of computing a great variety of forms of bills and accounts, examples whereof follow:

Example A, where the total is to be printed at the bottom of a column of items, thus:

June 10  5 yards_____ $2.20
         7 boxes_____  9.75
        12 packages_____  5.60
             Total_____ $17.55

To calculate such an example, one setting wheel is sufficient, and the pressing of the keys to print the numerical items will cause those items to be accumulated and the sum to appear on the figure wheels. In order that the act of printing the total at the bottom may automatically return the figure wheels to zero, it is necessary, before printing the total, to put the mechanism by hand into condition to subtract. This would be accomplished in this case by throwing the reversing lever 27ª. The printing of the total would thus cause said total to be simultaneously subtracted from the figure wheels which would of course return them to zero. This example is here illustrated for purpose of comparison merely, for the mechanism illustrated in my Patent No. 782554 can accomplish the same results.

Example B, where the total is to be printed at the side of a column, thus:

June 10  5 yards_____ $2.20
         7 boxes_____  9.75
        12 packages_____  5.60   $17.55

To calculate the above example, and clear the receiving mechanism by the act of printing the total, and at the same time employ only one setting wheel, (which is the case with the machine shown in the Patent No. 782,554) one of two things would have to be done: Either the receiving mechanism would have to be shifted the proper distance to the right along its slide 52 and the mechanism before printing the total be put by hand into condition to subtract, or else the setting wheel would have to be shifted the proper distance in the opposite direction, and the mechanism, as before, set in condition to subtract before the total is printed. But such shifting of the setting wheel (for which no provision is shown either here or in the aforesaid Patent No. 782,554) or the said shifting of the receiving mechanism on its slide (which can be accomplished here and could also have been accomplished in the aforesaid Patent No. 782,554) and the hand setting of the mechanism to subtract is undesirable, and all this is now avoided by means of the auxiliary setting mechanism, the stationary part of which had been hereinabove described. This auxiliary setting mechanism has its setting wheel 42 permanently located at the side, which avoids the necessity of said shifting and is constructed to subtract automatically, which avoids the necessity of setting the mechanism by hand in condition to subtract, before printing the total. Now, with the auxiliary setting wheel, should it be desired to calculate and print a bill like example B, it is only necessary to print said example in the ordinary manner, and the machine will automatically calculate the total and clear the receiving mechanism without any additional action on the part of the operator. As long as the items are being printed in the item column, the receiving mechanism travels over and is operated by the main setting wheel, and the total accumulates and appears in the figure wheels. But when it is desired to print that total at the side, the motion of the carriage to bring the paper so that the printing will appear in the proper position, also causes the shifting of the receiving mechanism away from the main setting wheel 41 and to a point opposite to the setting wheel 42, which setting wheel rotates in the opposite direction and therefore subtracts and consequently returns the figure wheels to zero simultaneously with the printing of the total at the side, provided of course that said auxiliary setting wheel is in geared connection with bevel pinion 34. Fig. 1, excluding the receiving mechanism shown by dotted lines, is a representation of the parts assembled in the proper manner to accomplish the results in the novel manner just described. The present machine, therefore, is, by the use of a single receiving mechanism, adapted not only to automatically add the items, but the act of printing the total at the side will automatically clear the receiving mechanism, that is, return the figure wheels to zero.

In order to bring setting wheel 42 into geared connection with pinion 34, to accomplish the above results, a cam 86 (Figs. 1, 12, 17 and 18) is mounted in the receiving mechanism in such location as to engage the pin 49 as the receiving mechanism moves past it, thereby shifting sleeve 44 on shaft 38 so as to bring bevel gear 43 into mesh with bevel pinion 34. The auxiliary setting wheel 42 performs no function when wheel 43 is out of mesh with pinion 34, and it may be desirable at times, as in printing a bill like example A, to render said auxiliary wheel nonoperative; and for this purpose the parts are so arranged that wheel 43 will remain out of mesh with pinion 34 unless the cam 86 throws it into mesh therewith. In order that cam 86 may be rendered operative or nonoperative upon pin 49, it is pivotally mounted in the side walls 59, 59, by means of the pins 87; and the parts are so arranged that when said cam is rotated to one position, as shown in Fig. 13, it will engage pin 49, in passing, but when rotated to another position, as shown in Fig. 12, it will pass by without engaging pin 49, and gear 43 will remain out of mesh with pinion 34 so that the auxiliary setting wheel will not be rotated. In the further description, unless otherwise stated, it may be understood that the cam remains operative and that therefore, the bevel gear 43 will be in mesh with pinion 34 whenever the receiving mechanism is in a position opposite to the auxiliary setting wheel.

Example C, where first the sum of one group of items is printed, and then, independently, the sum or subtotal of a second group is printed, and finally the grand total of all of the groups is printed, thus:

| | | | | |
|---|---|---|---|---|
| June 10 | 5 yards | $2.20 | | |
| | 7 boxes | 9.75 | | |
| | 12 packages | 5.60 | $17.55 | |
| June 12 | 50 yards | 18.00 | | |
| | 2 boxes | 3.50 | | |
| | 10 packages | 5.40 | 26.90 | |
| June 20 | 10 yards | 4.40 | | |
| | 20 cases | 13.00 | | |
| | 5 cartons | 7.00 | 24.40 | |
| | Total | | $68.85 | |

In order to calculate and print a bill of this kind, it is necessary to have two receiving mechanisms on slide 52 arranged at a distance apart equal to the distance between the two setting wheels 41 and 42 when the same are in action. Should both receiving mechanisms be operated at the same time, the first by the auxiliary setting wheel and the second by the main setting wheel, then the same number will be subtracted from the first and added to the second. The number will thus disappear from the first, and appear in the second; in other words the number will be transferred from the first receiving mechanism into the second.

In printing a bill like example C (where the first column after the descriptive matter contains the numerical items and the second column the subtotals of the numerical items) as long as the descriptive columns are being printed, neither one of the receiving mechanisms reaches or is affected by a setting wheel. While the item column is being printed, the first receiving mechanism (which is located at the left) is engaged and operated by the main setting wheel 41. The act of printing the items, at the same time causes the first subtotal of said items to accumulate and appear on the figure wheels of the first receiving mechanism. The shifting of the carriage the proper distance to print the subtotal in the proper place on the paper, brings receiving mechanism No. 1 into operative connection with the auxiliary setting wheel, and at the same time brings receiving mechanism No. 2 into operative connection with the main setting wheel 41. The printing of the subtotal now transfers the said subtotal from the first receiving mechanism into the second receiving mechanism, thereby making said first receiving mechanism ready for the next set of items while it preserves the subtotal in the second receiving mechanism. The operation is then repeated with the next set of items, and the second subtotal appears on the first receiving mechanism; and the printing of said second subtotal in the subtotal column then transfers it out of the first receiving mechanism, thereby clearing it, and into the second receiving mechanism, thus adding it to the first subtotal already in said second receiving mechanism. The figure wheels of the second receiving mechanism will therefore show the sum of the two subtotals. And so on. When it comes to the printing of the grand total, that grand total can be printed either at the bottom of the subtotal column, as shown, or at the side, as in example B. To print the grand total at the bottom, the procedure is the same as in example A; and to print the grand total at the side, the procedure is the same as in example B. Fig. 1, including the receiving mechanism shown by dotted lines, is a representation of the parts assembled in the proper manner to accomplish the novel results pointed out in connection with example C. With this arrangement of the machine, therefore, it is possible to obtain the subtotal or sum of each group separately and to know what the grand total of all the subtotals is, upon the instant that the last subtotal is printed. Moreover, the act of printing a subtotal will clear the receiving mechanism whereon it is shown (thus automatically making it ready for the next group) and the act of printing the grand total will clear the receiving mechanism whereon the grand total is shown.

It will be noted that when a connection between the receiving mechanism and wheel 42 is established, such connection is a positive non-yieldable one in the sense that neither is movable either backward or forward, without moving the other, and so also is the connection between wheel 42 and the valuating pinion 34 positive and non-yieldable. As a result, not only may motion be transmitted equally well in either direction, but overthrow is positively prevented.

There has now been described the form of mechanism best adapted to produce the type of bills shown in examples A, B and C, which types are those in most common use. But this invention readily adapts itself to the production of more complicated forms of bills and accounts, examples of which will follow, and the special mechanism for which will now be described.

This special mechanism is illustrated in Figs. 31 and 32 wherein shaft 90$^a$ is substituted for shaft 38 and is mounted in the stationary bracket 89 which takes the place of the frame pieces 39 in the first described form. An auxiliary setting shaft 90 is also mounted in said bracket in line with shaft 90$^a$ and each is rotatable independently of the other, but neither is laterally shiftable. Bevel gear 40 is rigidly set on shaft 90 and bevel gear 43 is rigidly set on shaft 90$^a$ in such position as to remain at all times in mesh with bevel pinion 34 set on shaft 35 in the maner previously described. The main setting wheel 41 is, as before, rigidly connected to and preferably integral with the bevel gear 40. The auxiliary wheels 91 and 92 are mounted upon shaft 90$^a$ at the left of bevel gear 43 so as to be independently rotatable and independently shiftable upon said shaft. The arms 93 are rigidly set upon shaft 90$^a$ for imparting motion to the setting wheels 91 and 92. This is accomplished by shifting the notched or perforated plates 94 into engagement with their respective arms 93 and the rotation of said plates is transmitted to the respective setting wheels 91 and 92 by way of the sleeves 95, which cause said plates and setting wheels to rotate as a single piece. The shifting of the sleeves 95 to bring plates 94 into and out of engagement with their respective arms 93 is effected by means of the levers 45 which are provided with pins 47 adapted to be engaged within the circumferential grooves or channels 96 on the sleeves 95. Said levers 45 are pivotally supported upon the stationary arms 97 extending from the bracket 89.

As in the construction previously described, the levers 45 carry pins 49, which are adapted to be contacted by the cams 86 on the receiving mechanisms, and the parts are so related that when a receiving mechanism is opposite to either of the auxiliary setting wheels 91 or 92, the cams 86 will hold the levers 45 in such position that the plates 94 will be in engagement with the arms 93 so that the rotation of shaft 90$^a$ will be imparted to the corresponding auxiliary setting wheel. The form of the parts 94 is not essential, except that it is necessary that for every one of the teeth in the auxiliary setting wheel there shall be a corresponding point of engagement between plate 94 and its arm 93 so that plate 94 may immediately engage its arm 93 when moved toward it. In other words, if the setting wheel 91 has thirty teeth, there must be thirty corresponding and equidistant points so that plate 94 and arm 93 may come into engagement with practically no lost motion.

In order that setting wheels 91 and 92 may be prevented from rotating when out of engagement with arms 93, the stationary pins 98 are formed in proper positions upon the bracket 89. It follows, therefore, that when the said mechanism is in position to be engaged by setting wheel 91, said setting wheel will, unless cam 86 be set to nonoperative position, be held in positive connection with shaft 90$^a$, so as to rotate therewith. The levers 45 are spring influenced to normally hold the plates out of engagement with the arms 93, and as a result, when said levers are not being operated upon by cam 86, the setting wheels 91 and 92 will be held stationary in contact with the pins 98.

The auxiliary setting wheel 99 lies at the right of the main setting wheel 41 and is so mounted upon shaft 90 as to be shiftable thereon and rotatable independently thereof. An arm 100 is rigidly fixed upon shaft 90 and is adapted to engage the plate 101 in the same manner and for the same purpose as arms 93 engage plates 94. Plate 101 and the auxiliary setting wheel 99 move as a single piece. The stationary pin 102 is formed upon the bracket 89 for preventing rotation of setting wheel 99 when disengaged from arm 100. The hub of setting wheel 99 has two circumferential grooves 103, and the spring dog 104 carried by bracket 89 is so mounted that its pointed extremity enters one or the other of said grooves 103 and thereby holds plate 101 either in or out of engagement with arm 100. Little force is required to shift wheel 99 upon shaft 90 by hand and in the preferred construction the grooves 103 are tapered so that by a light touch of the fingers the wheels may be moved from one position to the other and the dog 104 will snap into one or the other of grooves 103.

From the above description it is apparent that when setting wheel 99 rotates, it will be in the same direction as main setting wheel 41, and when setting wheels 91 and 92 rotate, it will be in the opposite direction to main setting wheel 41. It will also be apparent that auxiliary setting wheels 91, 92 and 99 may or may not rotate, depending upon their shifted position upon their supporting shafts.

By means of the mechanism which has just been described and which is shown in Figs. 31 and 32, the machine is able to produce bills and accounts such as those drawn in the following examples.

Example D, where there are three columns of figures side by side, one column representing minuends, the second column subtrahends; the third column differences. An account of this kind would occur in banking, thus:

|  | Deposits. | Withdrawals. | Balances. |
|---|---|---|---|
| Jan. 1 | $198.56 | $86.54 |  |
|  | 96.19 | 206.19 |  |
|  | 4.17 |  | $6.19 |
| Jan. 2 | 856.69 | 2000.00 |  |
|  | 45.20 | 86.25 |  |
|  | 1925.81 | 8.17 |  |
|  | 162.62 | 3.67 |  |
|  |  | 18.22 | 874.01 |
| Jan. 3 | 26.19 |  | 26.19 |
|  |  |  | $906.39 |

For this account there are required two receiving mechanisms, the main setting wheel 41, the primary auxiliary setting wheel 91 and the secondary auxiliary setting wheel 92. The setting wheel 99 will therefore be set to nonoperative position. The two receiving mechanisms are preferably both of the above described reversible form, and are set upon slide 52 at the proper places; and the arrangement of the parts is such that when receiving mechanism No. 1 (at the left) is operated by the main setting wheel 41, the printing occurs in the deposit column; when operated by setting wheel 91 the printing occurs in the withdrawal column and when operated by setting wheel 92 the printing occurs in the balance column. The other receiving mechanism (located at the right) is placed so that when No. 1 is operated by wheel 92 said other receiving mechanism is operated by wheel 41. In Fig. 32 said other receiving mechanism would therefore correspond to the one marked "No. 3", the receiving mechanism marked "No. 2" not being present for this form of account.

In writing the account, the items would be set down as they occur, in a line, not in a column; that is to say, a deposit would be printed and then on the same horizontal line a withdrawal, preserving the manner usually employed in writing on the typewriter. It will be noted that a withdrawal may be larger than the deposit which is set opposite to it on the same line.

In printing deposits receiving mechanism No. 1 is operated by main setting wheel 41 and the act of printing causes the sum of the deposits to accumulate in said receiving mechanism. In printing the withdrawals, receiving mechanism No. 1 is operated by the primary auxiliary setting wheel 91 in the opposite direction. And the act of printing the withdrawals causes them to be subtracted from the deposits and there consequently appears upon the figure wheels of receiving mechanism No. 1 the difference or balance. In printing the balance, receiving mechanism No. 1 is operated by the secondary auxiliary setting wheel 92 while receiving mechanism No. 3 is simultaneously operated by the main setting wheel 41. The act of printing, therefore, causes the balance to be subtracted from receiving mechanism No. 1 and to be added to receiving mechanism No. 3. Receiving mechanism No. 1 is therefore left clear for the next set of deposits and withdrawals while the balance is preserved and accumulates in receiving mechanism No. 3. This process is repeated to the end of the account. The sum of all the balances may now be printed either at the bottom or at the side of the balance column; if at the side the procedure is simply the act of printing the total; if at the bottom, the procedure is to set the cam 86 to nonoperative position and also set the mechanism in condition so that the main setting wheel 41 will subtract while printing the total. It will be noted that for an account like example D the auxiliary wheel 99 is not required and a machine may well be constructed in which it is entirely omitted.

Should there be only one item in the deposit column and one item in the withdrawal column for any given date, then the same mechanism will compute an account in this form:

|  | Deposits. | Withdrawals. | Balance. |
|---|---|---|---|
| Jan. 1 | $898.00 | $296.00 | $602.00 |
| " 2 | 493.00 | 187.00 | 306.00 |

It is thus clear that the machine may be used to perform subtraction in a horizontal line.

In a similar manner accounts like the following may be easily calculated:

|  | Checks. | Cash. | Total. |
|---|---|---|---|
| Jan. 1 | $29.65 | $18.70 | $48.37 |
| " 2 | 14.10 | 20.15 | 34.25 |

For the calculation of accounts of this kind, where the various items to be added and the total thereof are to be printed in a horizontal line, it is necessary only to have a plurality of setting wheels. In this particular case the mechanism illustrated in Figs. 31 and 32 will accomplish the result. To simply obtain the totals in the same line, as above, one receiving mechanism is sufficient. Said receiving mechanism would be first operated by the setting wheel 99, then by setting wheel 41 (which rotates in the same direction and would thus add the two items together), and finally by setting wheel 91 which rotates in the opposite direction and will thus subtract the total while the total is being printed, and will consequently clear the receiving mechanism ready for the next line of items. Should there be more than two items to be added, it is necessary simply to have more than two setting wheels which rotate in the same direction.

Example E illustrates another well known form of commercial account. The descriptive and other data are printed at the left of the page, the items are printed in column No. 1, the subtotals of groups of items are printed in column No. 2 if they are debits, and in column No. 3 if they are credits, thus:

|  |  | Column No. 1. | Column No. 2. | Column No. 3. |
|---|---|---|---|---|
| Apr. 3 | 1 Bag | $3.50 |  |  |
|  | 13 Silk | 13.00 |  |  |
|  | 1 Veiling | .35 |  |  |
|  | 1 Lace | 1.97 | $18.82 |  |
| Apr. 9 | 1 Veiling | .35 |  |  |
|  | 13 Silk | 13.00 |  | $13.35 |
| Apr. 24 | 1 Rug | 19.50 |  |  |
|  | 4 Collars | 2.00 |  |  |
|  | 2 Belts | 2.50 | 24.00 |  |
| Apr. 28 | 1 Lace | 1.97 |  |  |
|  | 1 Bag | 1.35 |  | 3.32 |
|  |  |  | 42.82 |  |
|  | Cr. |  | 16.67 |  |
|  | Bal. |  | 26.15 |  |

To calculate and print the body of an account of this kind, that is, all except the final footings of numerical columns Nos. 2 and 3, three receiving mechanisms and three setting wheels, 41, 91 and 92 are required.

In calculating and printing an account such as example E, the parts are so arranged that receiving mechanism No. 1 at the extreme left, No. 2 in the middle and No. 3 at the extreme right, are in proper place to be simultaneously operated by setting wheels 92, 91, and 41 respectively, as shown in Fig. 32. In other words, the distances between the units figures of any two receiving mechanisms is equal to the distance between the corresponding setting wheels; and the receiving mechanisms are so placed upon slide 52 that the calculating occurs while the figures are being printed in the proper columns on the paper.

In printing the items in numerical column No. 1, receiving mechanism No. 1 is operated by main setting wheel 41. The act of printing the items, therefore, causes the items to accumulate in said receiving mechanism No. 1 and there will appear upon the figure wheels thereof the sum of the group of items just printed which may be called the group subtotal. If that subtotal be a debit, it is to be printed in column No. 2 and in printing that subtotal receiving mechanism No. 1 will be operated by the auxiliary setting wheel 91 while receiving mechanism No. 2 will be operated by the main setting wheel 41. Receiving mechanism No. 1 will therefore be cleared for the next group of items, while the subtotal is transferred to and will accumulate in receiving mechanism No. 2. Should the subtotal represent a credit, it will be printed in column No. 3 and in printing that subtotal, receiving mechanism No. 1 will be operated by the auxiliary setting wheel 92, while receiving mechanism No. 3 will be operated by the main setting wheel 41. Receiving mechanism No. 1 will therefore be cleared, while that subtotal will be transferred to and will accumulate in receiving mechanism No. 3. The operation is then repeated for the next group of items, and so on. The final or grand total of the debit subtotals will now appear upon the figure wheels of receiving mechanism No. 2, while the grand total of the credit subtotals will appear on the figure wheels of receiving mechanism No. 3.

But during the operation of printing this account, while a credit subtotal was being printed in column No. 3, receiving mechanism No. 2 was in proper place to be operated by auxiliary setting wheel 91; and to prevent the creeping in of an error at this time it is necessary to render said setting wheel temporarily nonoperative. This is accomplished by setting the cam 86 in receiving mechanism No. 2 to nonoperative position so that it will miss pins 49. Said receiving mechanism No. 2 is therefore operated by the main setting wheel 41, but not by the auxiliary setting wheels; and this setting is permanent during the making of any account of this type.

To print the grand or final totals of the debit and credit columns in the particular locations where they are shown in this example, an auxilary setting wheel 99 is provided. It ordinarily remains nonoperative, but is thrown into operative position by hand only for the printing of the grand total of the credit subtotals in the debit column, and is immediately thereafter returned by hand to nonoperative position. The complete procedure in printing the grand totals and obtaining the balance therefor is, first, to throw the entire calculating mechanism out of connection with the printing mechanism by means of lever 18ª; second, to print the grand total of the debit subtotals in the debit column; third, to restore the operative connection between the calculating mechanism and the printing mechanism by means of lever 18ª; fourth, to set the calculating mechanism to subtract by means of lever 27ª; fifth, to render the auxiliary setting wheel 99 operative; sixth, to print the grand total of the credit subtotals in the debit column; seventh, to render wheel 99 again nonoperative; and finally to print the final balance. This completes the printing and leaves all the receiving mechanisms clear, ready for further use.

It will be noted that the parts required to produce example E will perform all of the functions necessary to produce accounts such as those shown in examples A, B, C and D.

The auxiliary setting mechanism has been described in a form adapted for use with a reversible receiving mechanism, because a reversible receiving mechanism is the most convenient kind to operate, but the invention can nevertheless be adapted for use with a nonreversible receiving mechanism. In a nonreversible receiving mechanism subtraction by reversing is impossible, and in order to print the total, and automatically clear the nonreversible receiving mechanism, the complement of the total must be added in accordance with the well known theory. To do this automatically and simultaneously print the total at the side, it is only necessary by the aid of this invention, to have mechanism such as is shown in Figs. 33 or 34. Referring to Fig. 33, shaft 38 is mounted as above and has rigidly set thereon the main setting wheel 41 driven by means of the bevel gear 40 which is at all times in mesh with the bevel pinion 34, on shaft 35. An auxiliary setting wheel 104 is mounted upon shaft 38 at a distance to the left of main setting wheel 41 equal to the distance between the units places of two adjacent columns on the paper. This wheel 104 therefore, will rotate in the same direction as setting wheel 41 instead of in an opposite direction. With the form of mechanism shown in Fig. 33, and a nonreversible receiving mechanism, the manner of operation would be as follows: In printing the body of a bill like example B, the receiving mechanism passes over or is opposite to the main setting wheel 41, but does not travel as far as setting wheel 104.

In printing the total at the side, however, the receiving mechanism passes across and is operated by the setting wheel 104, which rotates in the same direction as wheel 41. The keys are now struck so as to set up the complement of the total, and will thereby clear the receiving mechanism. But in the ordinary construction of the typewriter this would result not in the printing of the total required, but in the printing of the complement thereof.

To avoid any such consequence it is only necessary to change the type upon the type bars of the typewriter, say of the Remington style, so that each numerical key will print either a figure or its complement depending upon the position to which the paper carriage is brought by the shift key. For the body of the bill, the carriage would be in such position as to print the number that is being added, but for printing the total the carriage would be brought to position to print the number, but add its complement.

The same result may be accomplished with a nonreversible mechanism in another manner. It is only necessary to connect the key levers with two independent number setting mechanisms, so that the same key, say 7, would print a "7" on the paper and add a "7" on the first setting member and add a "2" (the complement of 7) on the other number setting mechanism. The means for accomplishing this is shown in Fig. 34, wherein the shaft 38 has two setting wheels both rotatable thereon, the main setting wheel 41 at the right and a second setting wheel 105 at the left. Setting wheel 41 is driven by the bevel pinion 34 on shaft 35 which, as in the previous instances, is connected with the ordinary number setting mechanism which causes the adding of such numbers as are being printed. Setting wheel 105 is driven by bevel pinion 106 on shaft 107 which is connected to the second number setting mechanism. Said second number setting mechanism (not shown) is of the regular construction, except that instead of adding the number which is being printed, it adds the complement thereof. In operating with a nonreversible receiving mechanism and the setting mechanism shown in Fig. 34, the procedure will be as follows: In printing the body of a bill like example B, the receiving mechanism will be operated by setting wheel 41, but during the printing of the total at the side, said receiving mechanism will be operated by the setting wheel 105. The operator will now depress the keys which will cause the printing of the total shown on the figure wheels, but, as the receiving mechanism is in mesh with setting wheel 105, operated by the number setting mechanism which causes the adding of a complement, the complement will be transmitted to the receiving mechanism. Of course a mistake would occur in the units places as is usual in operating calculating machines in accordance with the theory of complements, but this could be subsequently corrected by the operator.

I therefore do not wish to be understood as limiting myself to a combination wherein the receiving mechanism is reversible. It may be nonreversible. Nor is it necessary that the main setting wheel and auxiliary setting wheel rotate in opposite directions, for they may all rotate in the same direction.

The above mechanism has been described in connection with a typewriter of the Remington style, but the operating parts may be adapted to typewriters of various styles and makes, as will be readily understood by those skilled in the art.

In the mechanism above described, the auxiliary setting wheels 91 and 92 and 104 are operative or nonoperative on the receiving mechanism depending on whether or not they are connected to the driving means, but this form is only a matter of convenience, and the machine would still embody this invention if said auxiliary setting wheels were always in direct connection with the driving means. For example the setting wheels might be splined upon their respective shafts. It is known, of course, that the typewriter carriage, and therefore the receiving wheels of the receiving mechanism stop at definite points or stations at each step. To render the setting wheels nonoperative, therefore, (even though rotating) it is only necessary to make the receiving wheels thin, and to so place the setting wheel temporarily as to be opposite to the space between two adjacent receiving wheels, when the latter are at their stopping points or stations. The setting wheel would therefore rotate without affecting any of the receiving wheels. To render the setting wheel operative on the receiving mechanism, it is sufficient to so set the setting wheel as to be opposite to a point where a receiving wheel stops. Such a construction is illustrated in Figs. 36 and 37 where 108 is a shaft having a spline 109 and a bevel gear 110 which is rigidly fixed on the shaft and remains in mesh with the bevel pinion 34. The thin setting wheel 111 is rigidly fixed on the sleeve 112 which is shiftable upon said splined shaft but always rotated therewith. The shifting of the sleeve 112 is effected by the pin 47 acting in the groove or channel 48 in said sleeve as in the construction hereinabove described. The spring 45$^a$ tends to shift the setting wheel in one direction and the cam 86 tends to shift it in the opposite direction against the force of said spring. In Figs. 36 and 37 the receiving mechanisms are supposed to be in one of their rest positions, that is, a position where they momentarily remain stationary during their step by step travel with the carriage. The setting wheel at the right portion of said Figs. 36 and 37 is shown to be under the influence of cam 86, and the other setting wheel free therefrom. In operation, under such supposition, the action of the cam will be to establish the connection of the setting wheel with the receiving mechanism. But whether the result of the cam action will be to establish the connection or disestablish it depends also on where the receiving mechanism stops. Suppose the rest positions or stations of the receiving mechanism were one half step to the right or left of the positions shown in Figs. 36 and 37; in such case the action of the cam would be to break the connection between the receiving mechanism and the setting wheel. Consequently it is clear that either of the two following results are obtainable from the same mechanism, first the action of the cam may be to shift the setting wheel to active position against the force of the spring, or second, the action of the cam may be to shift the setting wheel to inactive position against the force of the spring. There is no difference in principle and in fact practically no difference in construction; it is merely a question as to what is the rest position (laterally), or station, of the receiving mechanism. I do not however herein claim this specific mode of controlling the setting wheel, (shown in Figs. 36 and 37,) as it forms the subject of a divisional application filed Nov. 13, 1905, Serial Number 287,151.

It is clear that in the form of device shown in Figs. 4 and 5 and elsewhere in the drawings, the cam 86 instead of throwing the bevel gear 43 into mesh with the pinion 34 may be arranged to throw it out of mesh against the force of the spring 45$^a$. In this case, as before, the cam would determine whether or not the connection between the operating means (pinion 34 for example) and the receiving mechanism were to be completed; the result depending upon which of its two positions the cam had been previously set in. This last construction is illustrated in Figs. 38 and 39 wherein the shifting lever 45$^b$ has its pin 49 on the right side of its fulcrum so as to be swung by the cam 86 in an anticlockwise direction or opposite to the direction in which the levers 45 are swung by said cam. The spring 45$^c$ tends to swing said lever 45$^b$ in a clockwise direction which would cause the bevel gear 43 to mesh with the bevel gear 34. The disadvantage of these last described constructions illustrated in Figs. 36, 37, 38 and 39 is that the auxiliary setting wheels would rotate all the time except when the cam establishes otherwise, whereas in the preferred form, said wheels would never rotate except when the cam establishes otherwise. For the purpose of this invention, it is sufficient that the setting wheels be capable of being rendered operative or nonoperative upon the receiving mechanism, but the manner of doing so is immaterial.

In the design of the machine here illustrated, the cam 86 upon which depends whether the setting wheel shall be operative or non operative upon the receiving mechanism, is shown to be carried directly by and upon the receiving mechanism. This, of course, causes the cam to move in unison with the receiving mechanism, but it is clear that other ways for causing the cam to travel in unison with the receiving mechanism, might be substituted without departing from the spirit of the invention.

In the machine here shown, the setting members are in the form of wheels, but those wheels might be of any radius, including a radius of infinite length, in which case the setting members would become racks. And in the following claims, the term rotating setting wheel is to be understood as including moving setting racks as a particular form.

In some of the claims I have used the term "multi-decimal receiving mechanism," and I wish this term to be taken in the sense of defining a totalizer as distinguished from a counter. In a counter a number can be inserted only in the lowest decimal place, whereas in the multi-decimal receiving mechanism employed by me in this invention a number may be inserted in a plurality of decimal places. To take an example, in a counter, if one wishes to insert the number 45, it is necessary to turn the lowest wheel forty-five steps. However, in a totalizer or multi-decimal receiving mechanism, if one wishes to insert the number 45, the element in the tens place of the receiving mechanism is turned four steps and the element in the units place of the receiving mechanism is turned five steps.

In the following claims which specify a multi-decimal receiving mechanism, I wish the receiving mechanism to be taken in the above defined sense as distinguished from the operations of an ordinary counter.

Many changes and modifications may be made in the precise structure herein disclosed without departing from the spirit of my invention.

What I claim as new and desire to secure by Letters Patent is:

1. In a calculating machine, the combination of a reciprocating key; a reversible receiving mechanism having positive connections with the key prior to the completion of the setting up action thereof, whereby the return of a key to original position returns the receiving mechanism to original position and hand releasable means for preventing the return motion of the key prior to the completion of its setting up action.

2. In a calculating machine, the combination of reciprocatory keys; a reversible receiving mechanism; a member adapted to be rotated by any one of the keys always in the same direction to set up the digits on said reversible receiving mechanism, a key being positively connected to said rotatable member until the completion of the rotation thereof; and means for preventing return rotation of said rotatable member to thereby prevent the rise of a partially depressed key.

3. In a calculating machine, the combination of a reversible receiving mechanism and a member rotating always in the same direction to set up the digits on said reversible receiving mechanism; a key for driving said rotatable member; and means for preventing the return rotation of said rotatable member, said key and rotatable member being positively connected together during the entire driving action of said key on said rotatable member and subsequently released therefrom, whereby said key is held in a partially depressed position unless the rotation of said rotatable member is completed.

4. In a calculating machine, the combination of a reciprocatory key, and a reversible receiving mechanism having positive connection with the key prior to the completion of the setting up action thereof; means for automatically preventing the return motion of the key prior to the completion of its setting up action; and hand operated means for releasing the key prior to the completion of the setting up action thereof, to thereby permit the return of the key and the parts of the receiving mechanism to their prior position.

5. In a calculating machine, the combination of a reversible number setting member; a reciprocatory key; mechanism for positively connecting the key to the setting member prior to the completion of the setting up action thereof whereby a movement of the key will produce a corresponding movement of the setting member; means for automatically disconnecting the key from said setting member after the completion of the setting up action thereof; and a pawl for preventing the reverse motion of the setting member prior to the completion of the setting up action thereof, whereby the key will be automatically prevented from returning to initial position unless the setting up action of the setting member be completed.

6. In a recording calculating machine, a laterally shiftable paper carriage adapted to be raised out of reach of the type; a laterally shiftable receiving mechanism; an arm for transmitting shifting motion from one to the other; and means on said arm for holding the carriage out of reach of the type.

7. In a recording calculating machine, a laterally shiftable slide, a receiving mechanism mounted thereon; means for setting up a number on said receiving mechanism; a laterally shiftable paper carriage; an arm fastened to said carriage; a keeper on said slide adapted to receive said arm for shifting said slide; and means for keeping said arm and carriage in elevated position out of reach of the type without disengaging said arm from said keeper.

8. In a recording calculating machine; a laterally fixed setting wheel; a shiftable slide; a receiving mechanism comprising figure wheels and a tens-carrying mechanism mounted on said slide and adapted to be operated by said setting wheel; a shiftable paper carriage; an arm fixed to said carriage; a bar pivoted to said arm at a point above the lower extremity thereof; and a keeper on said slide having side walls for receiving said arm at different points of elevation, said pivoted bar being adapted to rest upon the side walls of said keeper for holding the arm and carriage in an elevated position.

9. In a recording calculating machine, the combination with the keys and number setting mechanism, of a laterally fixed setting wheel adapted to rotate in either direction for setting up a number; a shiftable slide; a reversible receiving mechanism comprising figure wheels and a reversible-tens-carrying mechanism mounted on said slide and adapted to be operated by said setting wheel for adding or subtracting a number; a shiftable paper carriage; an arm for transmitting shifting motion from said carriage to said slide; means on said arm for holding the carriage out of reach of the type; and means for reversing the direction of motion imparted to the setting wheel by the number setting mechanism consequent upon the key strokes.

10. In a calculating machine, the combination of a laterally shiftable receiving mechanism; a rotatable setting wheel; means for alternately preventing the shifting of said receiving mechanism and the rotation of the setting wheel and releasing the same only one at a time, said preventing means to prevent said shifting of the receiving mechanism being made operative by the rotation of the setting wheel, whereby the shifting motion is prevented during the entire rotative motion of said setting wheel.

11. In a calculating machine, the combination of a laterally shiftable receiving mechanism; a toothed rotatable setting wheel; a toothed escape piece shiftable with the receiving mechanism; a lever adapted to engage said escape piece and said setting wheel and permit the motion of only one of them at a time, the rotation of said setting wheel forcing said lever into engagement with said escape piece; and means for moving said lever out of engagement with said escape piece into engagement with said setting wheel.

12. In a recording calculating machine, the combination of a laterally shiftable carriage for the paper; receiving mechanism shiftable with said carriage; a setting member for successively operating the parts of the receiving mechanism as the latter is shifted step by step, a key for operating the setting member and permitting the lateral shifting of the carriage, and an auxiliary retaining device operated by said setting member and connected to the receiving mechanism for preventing the shifting thereof prior to the completion of the setting up action of said setting member.

13. In a calculating machine, the combination of a laterally shiftable receiving mechanism; a laterally fixed setting wheel; an escape piece connected to one and a pawl connected to the other for preventing lateral movement of said receiving mechanism, the part connected to said setting wheel having a tooth for entering the teeth of said setting wheel when said pawl and said escape piece are disengaged from each other.

14. In a calculating machine, the combination of a laterally shiftable receiving mechanism; a laterally fixed setting wheel for operating the same; a rocking member adapted when rocked to one position to lock said wheel and when rocked to the other position to arrest the shiftable receiving mechanism, said rocking member being normally in engagement with said setting wheel; means for forcing said rocking member out of engagement with said setting wheel just prior to the rotation thereof to thereby release said setting wheel and simultaneously arrest said receiving mechanism, and means for returning said rocking member into engagement with said setting wheel after the completion of the rotation thereof to thereby lock said setting wheel and release said receiving mechanism.

15. In a calculating machine, the combination of a laterally shiftable receiving mechanism; a laterally fixed setting wheel for operating the same; a rocking member adapted when rocked to one position to lock said wheel and when rocked to the other position to arrest the shiftable receiving mechanism, said rocking member being normally in engagement with said setting wheel; means for forcing said rocking member out of engagement with said setting wheel just prior to the rotation thereof to thereby release said setting wheel and simultaneously arrest said receiving mechanism; an arm 81 connected to said rocking member for returning the same into engagement with said setting wheel and out of connection with said receiving mechanism, a locking pinion and a setting pinion acting upon said arm alternately for locking and releasing the same; and means for rotating said pinions alternately substantially as described.

16. In a calculating machine, the combination of a setting wheel; a receiving mechanism having registering wheels therein and being laterally shiftable to bring said registering wheels one after another into operative connection with said setting wheel to be driven thereby; and a locking piece movable with said receiving mechanism and extending entirely across the same so as to be operative upon all of the registering wheels therein; and means for automatically throwing said locking piece out of operative connection with said registering wheels during the connection of the latter with the setting wheel.

17. In a calculating machine, the combination of a setting wheel; a laterally shiftable receiving mechanism having a set of gear wheels therein one for each digital piece, said gear wheels being operated by said setting wheel *seriatim;* a locking piece in said receiving mechanism adapted to lock or release all of said gear wheels at one motion, said locking piece being normally in engagement with said gear wheels; and means for unlocking said locking piece from said gear wheels while said gear wheels are passing said setting wheel.

18. In a calculating machine, the combination of a setting wheel; a laterally shiftable receiving mechanism having a set of gear wheels therein one for each digital place operated by said setting wheel *seriatim;* a locking piece in said receiving mechanism adapted to lock or release all of said gear wheels at one motion, said locking piece being normally in engagement with said gear wheels; and a pin located in fixed position to engage said locking piece in passing to thereby force the same out of engagement with said gear wheels.

19. In a calculating machine, a receiving mechanism including tens carrying mechanism, and a plurality of setting members, each one whereof is capable of operating said receiving mechanism in all of its ordinal places.

20. In a calculating machine, the combination of a main setting wheel, an auxiliary setting wheel and a receiving mechanism shiftable relatively to said setting wheels, said receiving mechanism being opposite to and operated by the main setting wheel during the setting up of the number and said receiving mechanism being opposite to and operated by the auxiliary setting wheel during the clearing of the receiving mechanism.

21. The combination with a typewriter having a shiftable carriage, of a receiving mechanism shiftable with the typewriter carriage; a main setting wheel; and auxiliary setting wheels located to the right and to the left of the main setting wheel, all of said setting wheels being operative upon the receiving mechanism and being operable by any one of the figure keys of the typewriter.

22. In a calculating machine, the combination of a plurality of setting members and a reversible receiving mechanism shiftable relatively to said setting members, said receiving mechanism being opposite to and operated by the setting member to the right to perform addition and being opposite to and operated by the setting member to the left to perform subtraction.

23. In a recording calculating machine, the combination of a reversible receiving mechanism; means for setting up a number thereon and simultaneously printing in one column; and other setting means operative upon the same receiving mechanism in the same decimal column as before for again setting up a number thereon and simultaneously printing in another column.

24. In a recording calculating machine, the combination of a receiving mechanism; means for operating the same to add a number thereon and simultaneously print in a given decimal column; and other means operative upon the same receiving mechanism in the same given decimal column as before to subtract a number therefrom and simultaneously print in a different decimal column.

25. In a recording calculating machine, the combination of a receiving mechanism, printing means, a setting wheel for operating said receiving mechanism to add a number thereonto when the printing means is printing in one column and another setting wheel for operating said receiving mechanism to add another number thereonto while the printing means is printing in another column.

26. In a recording calculating machine, the combination of a receiving mechanism, means for setting up the number during the printing in one column; and means for automatically clearing said receiving mechanism by the act of printing the total in a different column.

27. In a calculating machine, the combination with totalizer mechanism comprising a row of totalizer gears and accompanying calculating mechanism, of a main driving wheel pivoted to the machine frame, a set of keys, driving mechanism connecting said set of keys with said main driving wheel, whereby the depression of any of said keys rotates said main driving wheel a differential amount, escapement mechanism to move the totalizer mechanism to carry the totalizer gears successively into engagement with the main driving wheel, and means operated by the actuation of a key to lock the totalizer frame against escapement before and during the time that the totalizer mechanism is being actuated upon further depression of the key to perform a calculation.

28. In a computing machine, the combination of an element to be shifted in a register actuating mechanism, of a traveling bar having adjustable offset portions arranged at predetermined positions thereon, and a power transmitting device arranged between the element to be shifted and the bar and arranged to transmit the shifting motion to the element to be shifted.

29. In a calculating machine, the combination of a receiving mechanism; a setting wheel for operating said receiving mechanism, said setting wheel being normally in position to be non-operative upon said receiving mechanism, and means upon said receiving mechanism for automatically bringing said setting wheel into position to be operative upon said receiving mechanism.

30. In a calculating machine, the combination of a receiving mechanism; a main and an auxiliary setting wheel each adapted individually to operate said receiving mechanism when the later is adjacent to them, said auxiliary setting wheel being movable bodily as well as rotatably; a setting pinion for rotating said setting wheels; connections between said main setting wheel and said pinion; and means operated from the receiving mechanism for moving said auxiliary setting wheel into and out of connection with said setting pinion.

31. In a calculating machine, the combination of a receiving mechanism; a main and an auxiliary setting wheel each adapted individually to operate said receiving mechanism when the latter is adjacent to them, said auxiliary setting wheel being movable bodily as well as rotatably; means for driving said setting wheels; and means operated from the receiving mechanism for moving said auxiliary setting wheel into position to be operative or into position to be nonoperative upon said receiving mechanism.

32. In a calculating machine, the combination of a receiving mechanism; a main and an auxiliary setting wheel each adapted individually to operate said receiving mechanism when the latter is adjacent to them, said auxiliary setting wheel being movable bodily as well as rotatably; a setting pinion for rotating said setting wheels; connections between said main setting wheel and said pinion; and means operated from the receiving mechanism for moving said auxiliary setting wheel into position to be operative or into position to be nonoperative upon said receiving mechanism.

33. In a calculating machine, the combination of a receiving mechanism; a main setting wheel for operating the same; driving means for operating said main setting wheel; a shiftable auxiliary setting wheel for also operating said receiving mechanism; a lever for shifting said auxiliary setting wheel into and out of engagement with said driving means; and means upon said receiving mechanism for operating said lever.

34. In a calculating machine, the combination of a receiving mechanism; a main setting wheel for operating the same; driving means for operating said main setting wheel; a shiftable auxiliary setting wheel for also operating said receiving mechanism; a lever for shifting said auxiliary setting wheel into and out of engagement with said driving means; a cam upon said receiving mechanism for operating said lever; and means for rendering said cam operative or nonoperative upon said lever.

35. In a calculating machine, the combination of a receiving mechanism, a main setting wheel; driving means therefor; an auxiliary setting wheel located to the right of said main setting wheel and operative at a different time upon the said receiving mechanism; and disconnectible connections between said auxiliary setting wheel and said driving means.

36. In a calculating machine, the combination of a main setting wheel; driving means therefor; a shaft also connected to said driving means and rotated thereby; an auxiliary setting wheel located to the right of the main setting wheel, said auxiliary setting wheel being loosely mounted on said shaft so as to be shiftable thereon and rotatable independently thereof; means rigidly secured to said shaft for rotating said auxiliary setting wheel when the latter is shifted into engagement therewith, and means for holding said auxiliary setting wheel in either of its shifted positions.

37. In a calculating machine, the combination of a receiving mechanism; a main setting wheel; a shaft arranged in line with the axis of said main setting wheel; a sleeve rotatably and shiftably mounted upon said shaft, said sleeve being adapted to be connected and disconnected from said driving means by being shifted along said shaft; a shifting device for shifting said sleeve into and out of operative connection with said driving means and an auxiliary setting wheel movable as a single piece with said sleeve for operating said receiving mechanism when the latter is disengaged from the main setting wheel.

38. In a calculating machine, the combination of a receiving mechanism; a main setting wheel for operating the same; driving means for operating said main setting wheel; a shaft arranged in line with the axis of said main setting wheel; an auxiliary setting wheel for also operating said receiving mechanism, said auxiliary setting wheel being rotatably and shiftably mounted on said shaft; and means for shifting said auxiliary setting wheel along said shaft into and out of operative connection with said driving means.

39. In a calculating machine, the combination of a receiving mechanism; a main setting wheel for operating the same; driving means for operating said main setting wheel; an auxiliary setting wheel for also operating said receiving mechanism; and means for connecting and disconnecting said auxiliary setting wheel to and from said driving means to thereby render said auxiliary setting wheel operative or non-operative upon said receiving mechanism.

40. In a calculating machine, the combination of a receiving mechanism; a main setting wheel for operating the same; an auxiliary setting wheel also adapted to operate said receiving mechanism; a shaft in line with the axis of said main setting wheel and having said auxiliary setting wheel shiftably mounted thereon, and means for automatically shifting said auxiliary setting wheel into geared connection with said main setting wheel when said receiving mechanism is opposite to said auxiliary setting wheel.

41. In a calculating machine, the combination of a main setting wheel; an auxiliary setting wheel and a receiving mechanism adapted to be operated by them one at a time, said setting wheels being mounted in a fixed part of the machine, and said receiving mechanism being movable into connection first with said main setting wheel and then into connection with said auxiliary setting wheel.

42. In a calculating machine, the combination of a receiving mechanism and a plurality of setting wheels adapted to operate the receiving mechanism one after the other, said plurality of setting wheels comprising a main setting wheel and an auxiliary setting wheel located to the right thereof for operating said receiving mechanism before it is operated by the main setting wheel, said auxiliary setting wheel being adapted to be set in operative or nonoperative condition.

43. In a calculating machine, the combination of a receiving mechanism embodying a tens carrying mechanism; a main and an auxiliary setting wheel both adapted to operate said receiving mechanism; driving means for operating said setting wheels and means for connecting and disconnecting said auxiliary setting wheel to and from said driving means.

44. In a calculating machine, the combination of a receiving mechanism; a main and an auxiliary setting wheel for operating said receiving mechanism; driving means for operating said setting wheels, said auxiliary setting wheel being spring influenced to normally remain out of connection with said driving means; and means for forcing said auxiliary setting wheel into connection with said driving means.

45. In a calculating machine, the combination of a receiving mechanism; a main and an auxiliary setting wheel for operating said receiving mechanism; driving means for operating said setting wheels, said auxiliary setting wheel being spring influenced to normally remain out of connection with said driving means; and a cam on said receiving mechanism for forcing said auxiliary setting wheel into connection with said driving means.

46. In a calculating machine, the combination of a plurality of setting members and a receiving mechanism adapted to be operated by said setting members one after the other, said setting members being adapted to move equal amounts in the same direction whenever driven by the same figure key.

47. In a calculating machine, the combination of a plurality of receiving mechanisms each embodying tens carrying mechanism and a plurality of setting wheels for operating said receiving mechanisms simultaneously in the same decimal columns of the respective receiving mechanisms, each of said setting wheels being capable of operating all of said receiving mechanisms.

48. In a calculating machine, the combination of two reversible receiving mechanisms each embodying tens carrying mechanism and two reversible setting members, one for each receiving mechanism, said setting members being adapted to operate said receiving mechanisms simultaneously in the same decimal columns of the respective receiving mechanisms.

49. In a calculating machine adapted to add and subtract, the combination of a main setting wheel, an auxiliary setting wheel, and two receiving mechanisms, each of said setting wheels being capable of rotating in one direction for addition and in the opposite direction for subtraction, and each of said receiving mechanisms being adapted to be operated by one of said setting wheels while the other receiving mechanism is being operated by the other setting wheel.

50. In a recording calculating machine, the combination of a shiftable paper carriage, a plurality of receiving mechanisms shiftable therewith, and a plurality of setting wheels located side by side to operate said receiving mechanisms one after another as said receiving mechanisms are brought opposite said setting wheels.

51. In a calculating machine the combination of a plurality of independent receiving mechanisms; a single setting means adapted to operate each of said receiving mechanisms; means for rendering the setting means operative or non operative upon the receiving mechanisms; and independent hand-adjustable controlling devices one for each receiving mechanism for controlling the last recited means whereby said setting means becomes operative or non-operative upon said receiving mechanisms individually and independently of each other.

52. In a calculating machine, the combination of a plurality of receiving mechanisms shiftable from right to left in calculating and having a set of receiving wheels one for each digital place in the receiving mechanism; and a plurality of setting members, each adapted to operate said receiving mechanisms, said receiving mechanisms being adapted to be shifted simultaneously and remain at a constant distance apart, and said setting members when in operative connection with said receiving mechanisms being located at a distance apart equal to the distance between the units receiving wheels of the respective mechanisms.

53. In a calculating machine, the combination of a plurality of receiving mechanisms each containing a tens-carrying mechanism; a key action and two pairs of setting wheels, each wheel of a pair rotating in the same direction and each setting wheel being operable by said key action, and some of said setting wheels being disconnectible from the key action to be thereby rendered temporarily non-operative.

54. In a calculating machine, the combination of a plurality of receiving mechanisms each containing a tens-carrying mechanism; a key action and two pairs of setting wheels, each wheel of a pair rotating in the same direction and each setting wheel being operable by said key action, and some of said setting wheels being adapted to be moved to a position to be nonoperative upon the receiving mechanisms.

55. In a calculating machine, the combination of a plurality of receiving mechanisms each containing a tens-carrying mechanism; a key action; two pairs of setting wheels, each wheel of a pair rotating in the same direction and each setting wheel being operable by said key action, and some of said setting wheels being disconnectible from the key action to be thereby rendered temporarily non-operative; and means for automatically moving said setting wheels into and out of operative position.

56. In a calculating machine, the combination of a receiving mechanism; two setting wheels for operating the same at different times and keys connected to said setting wheels for rotating them in opposite directions.

57. In a calculating machine, the combination of two setting wheels adapted to rotate in opposite directions when in connection with their driving means, means for driving said setting wheels and a reversible receiving mechanism adapted to be operated by first one of said setting wheels and then the other.

58. In a calculating machine, the combination of two setting wheels adapted to rotate in opposite directions when in connection with their driving means, means for driving said setting wheels, a reversible receiving mechanism, and means for automatically connecting said receiving mechanism with first one of said setting wheels and then the other.

59. In a calculating machine, the combination of a plurality of setting wheels adapted to rotate in opposite directions, a reversible receiving mechanism; and means for bringing said receiving mechanism into engagement with one of said setting wheels after the other.

60. In a calculating machine, the combination of a plurality of setting wheels, each adapted to set up numbers and comprising main and auxiliary setting wheels, said auxiliary setting wheels being adapted to rotate in the opposite direction from the main setting wheel, printing mechanism, a set of keys, and mechanism connecting said setting wheels, printing mechanism and keys, whereby, when said printing mechanism is operated by means of one of said keys, each of said setting wheels is rotated an amount corresponding to the number printed by said printing mechanism.

61. In a calculating machine, the combination of a reversible receiving mechanism; a main setting wheel for operating the same; an auxiliary setting wheel also adapted to operate said receiving mechanism; a setting pinion for driving said setting wheels, and separate reversed gear connections between said setting wheels and said setting pinion whereby the rotation of said setting pinion causes said setting wheels to rotate in opposite directions.

62. In a calculating machine, the combination of a main setting wheel, an auxiliary setting wheel; a reversible receiving mechanism adapted to be moved into connection first with said main setting wheel, then with said auxiliary setting wheel, and a setting pinion adapted to rotate said setting wheels in opposite directions.

63. In a calculating machine, the combination of a reversible receiving mechanism; a main setting wheel for actuating the same; a driving member for actuating said setting wheel; an auxiliary setting wheel normally out of connection with said driving member and adapted to rotate in a direction opposite to that of the main setting wheel for reversibly operating said receiving mechanism; and means for automatically throwing said auxiliary setting member into connection with said driving member.

64. In a calculating machine, the combination of two setting members and a reversible receiving mechanism adapted to be operated by said setting members one after the other, one of said setting members being adapted to move in one direction when operated by any figure key and the other of said setting members being adapted to move an equal amount in the opposite direction when operated by the same key.

65. The combination with a typewriter having a laterally shiftable carriage, of a reversible receiving mechanism shiftable with said carriage; and setting wheels mounted in a fixed part of the machine for operating said receiving mechanism, each setting wheel being operable by any one of the figure keys and when in operative condition located at a distance apart greater than the distance between the highest and lowest receiving wheels of the receiving mechanism whereby said receiving mechanism will be operated by said receiving wheels one at a time.

66. In a calculating machine, the combination of two multi-decimal reversible receiving mechanisms and two setting members, one for each receiving mechanism, said setting members being adapted to operate said receiving mechanisms simultaneously equal amounts in opposite directions.

67. In a calculating machine, the combination of a plurality of multi-decimal reversible receiving mechanisms and two pluralities of setting wheels, the setting wheels of one plurality all operating to add and the setting wheels of the other plurality all operating to subtract whereby the grand total of a plurality of items may be obtained.

68. In a calculating machine, the combination of a plurality of multi-decimal reversible receiving mechanisms; a pair of rotatable shafts; means for driving said shafts in opposite directions; and a plurality of setting wheels for operating said receiving mechanisms, some of said setting wheels being rotatable by one of said shafts and at least one other of said setting wheels being rotatable by the other of said shafts.

69. In a calculating machine, the combination of a plurality of reversible mechanisms shifting from right to left in calculating; and a plurality of setting wheels comprising a main setting wheel and auxiliary setting wheels located at the right and left thereof for operating said receiving mechanisms, the setting wheel to the right being adapted to rotate in the opposite direction to the auxiliary setting wheel to the left.

70. In a calculating machine, the combination of a plurality of multi-decimal receiving mechanisms; a bevel setting pinion; a pair of rotatable shafts; a bevel gear on each of said shafts in engagement with opposite sides of said bevel pinion for driving said shafts in opposite directions; and two pluralities of setting wheels, each plurality operable by one of said shafts for operating said receiving mechanisms.

71. The combination of a typewriter and a calculating attachment thereto, said typewriter having figure keys and a laterally shiftable carriage, and said calculating attachment comprising a tens-carrying mechanism connected to and shiftable with the carriage, and a plurality of setting wheels each operable by any of the figure keys for operating said tens-carrying mechanism.

72. In a key operated calculating machine, a plurality of receiving mechanisms each embodying tens carrying mechanism, in combination with a plurality of setting wheels all operable from the same set of figure keys and adapted to operate the different receiving mechanisms simultaneously in columns having the same place value, said setting wheels always remaining a fixed distance apart except for a variation of a fraction of a decimal space.

73. In a calculating machine, totalizing mechanisms, two setting wheels, printing mechanism adapted to print a plurality of numbers each composed of several decimal places in a horizontal line, means for operating both the printing mechanism and setting wheels simultaneously to print and register the same number and means for supporting the setting wheels at a constant distance apart during the operation of the machine for successive numbers.

74. In a combined typewriter and adder, the combination with a traveling typewriter carriage of a receiving mechanism, a setting wheel normally non operative upon said receiving mechanism and a two position means adapted when in one position to automatically cam the setting wheel into operating condition.

75. In combination, a receiving mechanism or totalizer and a setting wheel for operating the same, one traveling relatively to the other, numeral keys for driving the setting wheel and means including a cam traveling in unison with the part that travels for acting upon the setting wheel, said cam being capable of being set in either of two positions, in one of which it is capable of establishing a positive interlocked connection between the receiving mechanism and the keys and in the other of which it is incapable of establishing such connection.

76. In a calculating machine, the combination of a receiving mechanism, setting means for operating the same, and a controlling device whereby the operator may predetermine whether said setting means shall or shall not operate the receiving mechanism when the receiving mechanism is within the field of operation, said controlling device comprising a spring urged member and a hand adjustable part adapted to be set in a position where it will be operative and in a position where it will be inoperative upon said spring urged member, said hand adjustable part being spring held in each of said positions and being laterally non shiftable relatively to the receiving mechanism.

77. In a calculating machine, the combination of a traveling receiving mechanism; a setting wheel for setting up the numbers thereon; and means governed by the receiving mechanism for automatically rendering the setting wheel operative at a time when it would otherwise be nonoperative upon the receiving mechanism.

78. In a calculating machine, the combination of a receiving mechanism and a setting wheel for operating the same, one being shiftable relatively to the other, normally non-operative means for positively connecting the two in such manner that a rotary movement of one in either direction compels a corresponding rotary movement in the other, and a device for controlling said connecting means, said controlling device including a plurality of pieces, one whereof is a cam and is hand adjustable for rendering said connecting means operative when said cam is adjusted to proper position, said cam being non-traveling relatively to the receiving mechanism and the other piece of said controlling device being non-traveling relatively to said setting wheel, and said two pieces of the controlling device being adapted to first engage and then disengage each other during the travel of the traveling piece for rendering the connecting means operative on the setting wheel during only a limited field of operation, the extent of the field being determined by the length of the cam.

79. In a calculating machine, the combination of a traveling receiving mechanism, a setting wheel for setting up the numbers thereon and a cam of limited length traveling in unison with the carriage for automatically rendering the setting wheel operative at a time when it would otherwise be non-operative upon the receiving mechanism, the length of the cam determining the extent of the field of operation of the setting wheel.

80. In combination, a receiving mechanism, a setting wheel therefor capable of rotatory movement in two directions, said receiving mechanism and setting wheel being relatively movable, and coöperating engaging parts, one of which is carried by the receiving mechanism and is adapted to assume two positions in only one of such positions is such an operative connection made between the receiving mechanism and the setting wheel that a movement either forward or backward in either one of them is positively transmitted to the other.

81. In combination, a receiving mechanism, operating means therefor, a cam of limited length adapted to assume different positions, in one of which a positive geared connection between the receiving mechanism and the operating mechanism is established and in another of which positions the connection between the receiving mechanism and the operating mechanism remains unestablished, a device contacting the cam for the length thereof and coöperating therewith to establish said connection between the receiving mechanism and the operating mechanism, whereby the field of operation of the operating means is limited by the length of the cam.

82. In combination, a reversible receiving mechanism, and master means for operating the same, one capable of traveling relatively to the other, and means including two coöperating pieces, one of which is adjustable to either of two positions and is carried by the traveling parts of the machine for automatically establishing the operative connection between said receiving mechanism and master means if adjusted to one position, and not establishing such connection if adjusted to the other position, one of said coöperating pieces having a cam-like action upon the other at some point of the travel, if the proper piece is adjusted to operative position, and said operative connection when established being capable of transmitting motion in either of two opposite directions.

83. In combination, a reversible receiving mechanism and master wheel for operating the same, one traveling relatively to the other, and a selection device, by means of which the operator may predetermine whether the connection between said receiving mechanism and master wheel shall or shall not be established, said selection device including a plurality of pieces, one of which is capable of occupying two positions, in one position being without effect, and in the other position being effective for a limited part of its travel to establish the said connection between the receiving mechanism, and master means, one of the parts of the selection device traveling in unison with the traveling part of the machine for coming into action upon another part of the selection device, and one of such coöperating parts of the selection device being identical with the aforesaid one capable of occupying two positions.

84. In combination, a receiving mechanism and a master wheel for operating the same, one traveling relatively to the other, and a cam device controlling the activity of said master wheel including two coöperating pieces, one of which is a cam, one of said cooperating pieces traveling relatively to the other and in unison with the traveling part of the machine, and adapted to operate upon the companion piece for a limited distance, and then leave such companion piece during further movement in the same direction, so that there is a definitely limited field of action of the two parts of the cam device, and one of said pieces being adapted to occupy and be retained in either of two positions in only one of which it becomes effective upon its coöperating piece to establish the connection between the receiving mechanism and the master wheel.

85. The combination of a receiving mechanism or totalizer, a plurality of master-wheels, and connections whereby one master-wheel is operated in one direction to add on the receiving mechanism or totalizer and the other master-wheel is operated in the opposite direction to subtract on the receiving mechanism or totalizer.

86. The combination of a plurality of multi-decimal receiving mechanisms, a plurality of master-wheels, and connections whereby when one master-wheel is operated in one direction to add on one receiving mechanism, the other master-wheel operates on another receiving mechanism to subtract.

87. In a calculating machine the combination of a receiving mechanism or totalizer, figure keys, means operated by said keys for actuating said totalizer, a traveling carriage for determining the decimal place of actuation of said totalizer, and means for preventing the travel of the carriage during the period of action of the actuating means.

88. In a calculating machine the combination of a traveling carriage, a receiving mechanism or totalizer traveling in unison with said carriage for determining the decimal place of actuation of said totalizer, figure keys, and means operated by said keys for actuating said totalizer, and means for preventing the travel of the carriage during the period of action of the actuating means.

89. In a calculating machine the combination of a receiving mechanism or totalizer, figure keys, means operated by said keys for actuating said totalizer, a traveling carriage for determining the decimal place of actuation, a coöperating detent and rack for preventing the travel of said carriage and means for establishing the operative connection between the detent and rack during the period of actuation.

90. In a calculating machine the combination of a receiving mechanism or totalizer, figure keys, means operated by said keys for actuating said totalizer, a traveling carriage for determining the decimal place of actuation, a coöperating detent and rack for preventing the travel of said carriage, means for establishing the operative connection between the detent and rack during the period of actuation, and means for breaking the operative connection between said detent and rack subsequent to said period of actuation.

91. In combination, a receiving mechanism and a master means for operating the same, one traveling relatively to the other and each having a gear wheel adapted to become enmeshed with and unmeshed from the gear wheel of the other, so that the connection between the receiving mechanism and master means may be established and disestablished; and controlling means whereby the operator may predetermine whether or not said gear wheels shall or shall not become unmeshed when the receiving mechanism and master means are in juxtaposition, said controlling means including a cam device consisting of two coöperating pieces, one of which is a cam, one of said coöperating pieces traveling relatively to the other and in unison with whichever of the receiving mechanism or master means travels, and one of said coöperating pieces being adapted to occupy and be retained in either of two positions, in only one of which positions it acts upon its coöperating piece to thereby throw the gear wheels of the receiving mechanism and master means into mesh with each other.

92. In combination, a receiving mechanism and a master wheel for operating the same, one traveling relatively to the other, and a cam device including two coöperating pieces, one of which is mounted upon the same support as the receiving mechanism and the other is mounted upon the same support as the master wheel, so that said pieces have relative motion, one of the pieces of the cam device being adjustable whereby it is capable of occupying and being retained in either of two positions, in only one of which will it act upon its coöperating piece, and in only one of said positions of said adjustable piece is the connection between the receiving mechanism and the master wheel established.

93. In a calculating machine, the combination of a receiving mechanism shiftable step by step; a setting wheel for setting up the members thereon at the points of rest thereof, a spring tending to render and maintain the setting wheel non-operative upon the receiving mechanism; and means including a member moving in unison with the receiving mechanism and capable of overcoming said spring for rendering the setting wheel operative upon the receiving mechanism within the limits of the field of operation of the setting wheel on the receiving mechanism.

94. In a calculating machine, the combination of a traveling carriage, a receiving mechanism; a setting wheel for registering the members thereon; a valuating member adapted to move different amounts depending upon the value of the digit to be registered, said setting wheel being capable of being thrown into and out of gear with said valuating member, a spring tending to throw said setting wheel out of gear with the valuating member, and a piece traveling in unison with the carriage and capable of acting upon said setting wheel to positively throw it into gear with said valuating member.

95. In combination, a receiving mechanism; operating means adapted to make positive gear connection therewith, said operating mechanism being normally non-operative upon the receiving mechanism, and a cam device for establishing the connection between the receiving mechanism and operating means, said cam device including two coöperating pieces one of which travels relatively to the other and is adapted to first make contact with its coöperating piece and subsequently leave the same during travel in the same direction, whereby the field of operation of the operating means upon the receiving mechanism may terminate prior to the termination of travel of the traveling piece of the cam device, one of the parts of the cam device being capable of being set in two different positions, in one only of which it contacts its coöperating piece, and one of said pieces being a cam adapted in contacting its coöperating piece to move the same in a direction non-coincident with the line of travel.

96. In a calculating machine, the combination of a receiving mechanism; operating means therefor, one adapted to travel relatively to the other and adapted to make positive geared connection therewith for a limited portion of the travel of the traveling part, said operating means being normally non-operative; and a cam device whereby the operator may predetermine whether or not the connection shall be established between the receiving mechanism and operating means within the possible field of operation, said cam device including two coöperating pieces, one of which travels in unison with the traveling part of the machine, and one of said two coöperating pieces being adapted to contact the other for a distance terminating short of the termination of travel of the traveling part of the machine, and one of said coöperating pieces being a cam adapted to move its coöperating piece in a direction non-coincident with the line of travel, and one of said coöperating pieces being capable of being set in two positions in only one of which it may come into contact with its coöperating piece, said cam having a dwell delimiting the field of operation.

97. In a combined typewriter and adder, the typewriter having a traveling carriage, a receiving mechanism and a setting member for operating it, and a selection device whereby the operator may predetermine whether or not the setting member shall operate the receiving mechanism, said selection device including two coöperating pieces, one stationary and the other traveling relatively thereto, so as to come into contact therewith and pass beyond the same while continuing its travel in the same direction, the traveling piece of the selection device moving in unison with the typewriter carriage and consisting of a cam having a dwell delimiting the field of operation of the selection device, and one of the pieces of the selection device being capable of being set in either active or non-active position.

98. In a combined typewriter and adder, the typewriter having a traveling carriage, a receiving mechanism and a single setting member for operating it in all the ordinal places thereof, and a selection device whereby the operator may predetermine whether or not the setting member shall operate the receiving mechanism, said selection device including two coöperating pieces, one stationary and the other traveling relatively thereto, so as to come into contact therewith and pass beyond the same while continuing its travel in the same direction, the traveling piece of the selection device moving in unison with the typewriter carriage and consisting of a cam having a dwell delimiting the field of operation of the selection device, and one of the pieces of the selection device being capable of being set in either active or non-active position.

99. In a combined typewriter and adding machine, the typewriter having a traveling carriage, and the adding machine including a recording mechanism traveling in unison with the typewriter carriage, a setting member for operating the receiving mechanism as the latter travels past it, said receiving mechanism traveling into and beyond the field of operation of the setting member, and a selection device of limited length whereby the operator may predetermine whether or not the setting member shall operate the recording mechanism while the latter is within the field of operation, the field of action of the selection device being substantially coincident with and limited to the length of said selection device.

100. In a combined typewriter and adding machine, the typewriter having a traveling carriage, and the adding machine including a recording mechanism traveling in unison with the typewriter carriage, a setting member for operating the recording mechanism as the latter travels past it, said recording mechanism traveling into and beyond the field of operation of the setting member, and a selection device whereby the operator may predetermine whether or not the setting member shall operate the recording mechanism while the latter is within the field of operation, said selection device including two coöperating pieces, one stationary and one traveling with the recording mechanism, and adapted to come against and pass beyond said stationary piece when traveling in the same direction, and one of said pieces of the selection device being capable of being set in two positions, in only one of which it becomes active upon its coöperating piece, and one of said pieces of the selection device being of limited length, thereby determining the extent of the field of operation of the setting member.

101. In combination, a receiving mechanism and operating means therefor, one traveling relatively to the other, and a selection device by means of which the operator may predetermine whether the connection between the receiving mechanism and operating means shall be established, said selection device including a plurality of parts, one traveling and the other stationary, one of the parts consisting of a cam having a dwell which delimits the zone of operation, said cam when set to engage the other part being effective thereon throughout the length of the dwell and thereby maintaining the connection between the receiving mechanism and the operating means, but said cam being ineffective during further movement in the same direction.

102. The combination with a carriage, of an escapement therefor, a key operable to cause the escapement to operate, and means to prevent any operation of the escapement after the beginning of the operation of the key until the key has completed its stroke.

103. The combination with a carriage, of a key, escapement mechanism tending to cause escapement of the carriage upon actuation of the key, and locking means for preventing escapement until the key has completed its stroke.

104. The combination with a carriage, of a key, escapement for the carriage adapted normally to operate upon actuation of the key, and means for preventing any operation of the escapement at any intermediate point in the stroke of the key.

105. The combination with a carriage, of a key, an escapement for the carriage adapted normally to operate upon actuation of the key, and means for preventing any operation of the escapement when the key is initially moved from any intermediate point in its stroke.

106. The combination with a carriage, of an escapement therefor, keys, means normally operable upon actuation of a key to cause the escapement to operate, and means for preventing any operation of the escapement when a key is at any intermediate point of its stroke.

107. In a calculating machine, the combination with a supporting frame, of escapement mechanism connected therewith, a totalizer secured to the supporting frame, driving mechanism associated with keys of the machine, depression of a key causing the totalizer to be operated to perform calculations and tending also to cause operation of the escapement mechanism, and means for preventing any operation of the escapement mechanism after the beginning of the depression of the key until the key has completed its stroke.

108. In a calculating machine, the combination with indicating mechanism carried in a frame, of an escapement associated with the frame, keys, driving mechanism associated with the keys and adapted upon operation of a key to cause operation of engaged indicating mechanism, and a locking arm adapted to engage in retaining slots upon operation of a key to lock the escapement against any operation after the beginning of the operation of the key until the key has completed its stroke.

109. The combination with a plurality of reversible computing devices each including a series of digit carriers, of a plurality of numeral keys, digit printing mechanism, actuating means operated by each of the keys for actuating any two corresponding carriers of said computing devices in unison, and means for reversing the action of the keys on said actuating means whereby a wrong insertion may be corrected.

110. The combination with a plurality of reversible computing devices, each including a series of digit carriers, of reversible operating means common to all of the carriers of said devices and simultaneously presentable in operated relation with corresponding carriers thereof, and digit printing mechanism.

111. The combination with a platen and printing mechanism, relatively movable to permit the printing of a column of numbers on a work sheet supported by the platen, of a reversible column computing device adapted to be positioned with reference to either column, an additional reversible computing device, and a series of operative keys each of which is common to and arranged to simultaneously operate said computing devices both for addition and subtraction.

112. The combination with a platen and printing mechanism, relatively movable to permit the printing of a column of numbers on a work sheet supported by the platen, of a reversible column computing device, an additional reversible computing device and means for both additively and subtractively operating said computing devices in correspondence and for controlling the relative movement of the platen and printing mechanism.

113. The combination with printing mechanism and a plurality of separate reversible computing devices, of keys for operating the printing mechanism and for simultaneously operating said computing devices in either direction in correspondence with each other.

114. A typewriter having figure keys, type bars operated thereby, a platen on which said type bars are adapted to print, each of said type bars having two figures thereon, one of which is the complement of the other, and a shift key for determining which of the figures on the type bars shall do the printing, in combination with a totalizer, and master mechanism for operating the totalizer, said master mechanism being operated by the figure keys of the typewriter.

115. A typewriter having figure keys, type bars operated thereby, a platen on which said type bars are adapted to print, each of said bars having two figures thereon, one of which is the complement of the other, and a shift key for determining which of the figures on the type bars shall do the printing, in combination with a totalizer, and master mechanism for operating the same, said master mechanism being operated by the figure keys of the totalizer.

116. The figure keys, type bars, shift key, supporting frame, carriage, platen and escapement of a typewriter, in combination with a totalizer, a plurality of master wheels adapted to actuate the totalizer, one after the other, and a differential mechanism operated by the figure keys of the typewriter, and adapted to rotate the master wheels in the same direction, the type bars belonging to said figure keys each having two type figures, one of which is the complement of the other.

117. The combination with a typewriting machine including printing mechanism, a frame, and a traveling carriage, of a cam having a dwell, a lever presented in operative relation to the cam by the movement of the carriage and moved to a definite position by said cam and held in such position throughout the zone of carriage travel delimited by said dwell, calculating mechanism including differential mechanism, key mechanism connected to said calculating mechanism, and means controlled by said lever for effecting a connection and disconnection between elements of said calculating mechanism itself, leaving a portion of the calculating mechanism unaffected by such disconnection.

118. In a calculating machine, the combination of a traveling totalizer, operating means therefor, controlling means determining whether the operating means shall or shall not operate the totalizer, said controlling means including two coacting members one of which is a cam which by its shape determines the operation or nonoperation of the operating means and at which point of the travel of the totalizer the operation or nonoperation shall occur, the coaction of the cam and its coacting member occurring as an incident to the traveling of said totalizer.

119. In a typewriter and adder, a typewriter having numeral keys, two complemental sets of numeral types, means for causing any given key to operate either of two types of complemental values to print, in combination with an adding mechanism operated by any given numeral key to accumulate constant value.

120. In a computing machine, the combination of an element to be shifted in a register actuating mechanism, of a traveling bar having offset portions arranged at predetermined positions thereon, and a power transmitting device arranged between the element to be shifted and said bar and arranged to transmit the shifting motion to the element to be shifted.

121. In a computing machine, the combination of an element to be shifted in a register actuating mechanism, of a traveling bar having offset portions supported thereon, said offset portions being arranged to correspond with certain of the columns to be printed, and a rocking element having a member adapted to ride on said offset portions and be shifted thereby and being operatively connected to the element to be shifted.

122. In a computing machine, the combination of an element to be shifted in a register actuating mechanism, a traveling bar having offset portions arranged at predetermined positions thereon, a lever having an arm adapted to contact and to be actuated by said offset portions, an arm operatively connected with the element to be shifted, and a spring for causing said arm and said lever to move relatively to said bar when said offset portions pass out of contact with said lever.

123. In a computing machine, the combination with an element to be shifted in a register actuating mechanism, of a traveling bar having offset portions arranged at predetermined positions thereon, and a bell crank lever fulcrumed upon the stationary portion of the machine and having an arm adapted to be actuated by said offset portions and an arm connected to the element to be shifted.

124. In a computing machine, the combination with an element to be shifted, of a traveling bar having offset portions arranged at predetermined intervals thereon, a bell crank lever fulcrumed upon a stationary portion of the machine and having an arm adapted to ride on said offset portions and also an arm connected to the element to be shifted, and a spring for maintaining the first named arm in position to be operated upon by said offset portions.

125. In a computing machine, the combination with an actuator element which is to be shifted, of a bell crank lever having an arm operatively connected to the element to be shifted and being provided with a roller upon its other arm, a traveling bar having offset portions arranged at predetermined positions thereon, said offset portions being adapted to contact with said roller during the travel of said bar, substantially as and for the purposes set forth.

126. In a computing machine, the combination with an actuator element which is to be shifted, an actuator pinion operated by said element to be shifted, a traveling register actuated by said actuator pinion, a register supporting bar, offset portions carried by said bar and arranged in predetermined positions thereon, and a bell crank lever operatively connected with said element to be shifted and having an arm riding on said offset portions and adapted to be actuated thereby.

127. In a computing machine, the combination with an actuator element which is to be shifted, register actuating mechanism whose operation is determined by the position of said element to be shifted, a traveling register actuated by said actuating mechanism, a register supporting bar, offset portions mounted on said bar and arranged in predetermined positions thereon, a bell crank lever operatively connected with said element to be shifted and having an arm adapted to be operated by said offset portions and a spring engaging said lever and adapted to hold it in a position to be operated upon by said offset portions.

128. In a calculating machine the combination of operating keys which tend to return to normal position when depressed, means for retaining a key in depressed position if not sufficiently depressed and means for releasing said keys without completion of the down stroke.

129. In a calculating machine the combination of operating keys which tend to return to normal position when depressed, means for retaining a key at any intermediate point in its downward travel, means for releasing said key at any such point.

130. In a calculating machine the combination of operating keys which tend to return to normal position when depressed, means for retaining a key in depressed position if not sufficiently depressed, and means operative on said retaining means for releasing said keys without completion of the down stroke.

131. In a calculating machine, the combination with a totalizer and actuating means therefor of operating keys adapted to operate said actuating means, said keys tending to return to normal position when depressed, means for retaining a key in depressed position if not sufficiently depressed; and hand operative means for releasing said keys.

132. In a calculating machine, the combination of operating keys which tend to return to normal position when depressed, a ratchet device for retaining a key in depressed position if not sufficiently depressed, said ratchet device including a toothed member and a pawl adapted to act thereon, one of said parts of the ratchet device being non-yieldingly connected to the key whereby the movement of one controls the movement of the other; and means for releasing said key at any point of its depression.

133. In a calculating machine, the combination of operating keys which tend to return to normal position when depressed, a ratchet device for retaining said keys in partially depressed position if insufficiently depressed, and non-yielding connections including links and toothed gear wheels for connecting the keys to one part of said ratchet device whereby the movement of a key is always simultaneous with the movement of the connected part of the ratchet device; and means for releasing the keys at any point in their positive stroke.

134. The combination with a computing device including a series of tooth-driven elements, of a tooth driving element adapted to mesh therewith, said computing device and the driving element being relatively movable in a lateral direction to establish an operative relation between the driving element and successive driven elements, a set of keys adapted to differentially drive said toothed driving element, and a guard adapted to enter any one of the interdental spaces of the driving element to lock the same against rotary movement during the relative lateral movement of the driving and driven elements.

135. In a calculating machine the combination of operating keys which tend to return to normal position when depressed, a ratchet device for retaining a key in depressed position if insufficiently depressed, said ratchet device including a toothed member nonyieldingly connected to and operated by the keys, and a pawl having a stationary pivot and adapted to act upon said toothed member; and means operative upon said pawl for releasing said keys.

136. In a calculating machine, the combination of operating keys which tend to return to normal position when depressed, means for retaining a key in depressed position if not sufficiently depressed, and a hand device for releasing said keys.

137. In a calculating machine, the combination of operating keys which tend to return to normal position when depressed, a universal member operated by any one of said keys, and normally rotating always in the same direction, and means for preventing the negative rotation of said universal member and means for releasing said preventing means.

138. In combination, a totalizer, a master member geared thereto for actuating the same, valuating mechanism for operating said master member, and full stroke mechanism; said valuating means including a rotatable digit shaft rotating always in the same direction an amount depending upon the value of the digit to be registered, positive gear connections between said digit shaft and said master member, self-returning depressible figure keys and nonyielding connections between said digit shaft and each of said keys; and said full stroke mechanism including means for retaining said keys in partially depressed position and means for releasing said retaining means to permit the key, totalizer, and connected parts to be returned to original position.

139. In combination, a totalizer, a master member for operating the same, said master member moving different amounts depending upon the value of the digit to be registered, means including depressible keys for actuating said master member, said keys being adapted to commence their depression prior to the commencement of movement of said master member; and a full stroke mechanism adapted to retain a key in partially depressed position, said full stroke mechanism being adapted to operate upon a key prior to the commencement of motion of said master member.

140. In combination, a totalizer, a master member for operating the same, said master member moving different amounts depending upon the value of the digit to be registered, means including depressible keys for actuating said master member, said keys being adapted to commence their depression prior to the commencement of movement of said master member; and full stroke mechanism adapted to retain a key in partially depressed position, said full stroke mechanism being adapted to operate upon a key subsequent to the completion of motion of said master member.

141. In combination, a totalizer, a master member for operating the same, said master member moving different amounts depending upon the value of the digit to be registered, means including depressible keys for actuating said master member, said keys being adapted to commence their depression prior to the commencement of movement of said master member; full stroke mechanism adapted to retain a key in partially depressed position, said full stroke mechanism being adapted to operate upon a key prior to the commencement of motion of said master member, and hand operated means for releasing said retaining means.

142. In combination, a totalizer, a master member for operating the same, said master member moving different amounts depending upon the value of the digit to be registered, means including depressible keys for actuating said master member, said keys being adapted to commence their depression prior to the commencement of movement of said master member; full stroke mechanism adapted to retain a key in partially depressed position, said full stroke mechanism being adapted to operate upon a key subsequent to the completion of motion of said master member, and hand operated means for releasing said retaining means.

143. In a calculating machine, a traveling element, a totalizer, an amount determining device adapted to operate the totalizer digitally, controlling means for determining whether or not said amount determining device shall or shall not operate the totalizer, said controlling means including two coacting members, one of which is a cam having a dwell and inclines at each end of said dwell, whereby there is delimited a zone throughout the extent of which the condition determined by said controlling means persists, one of said two coacting members being supported upon said traveling element and being adjustable thereon lengthwise of the direction of travel thereof.

144. In a calculating machine, a traveling element, a totalizer, an amount determining device adapted to operate the totalizer digitally, controlling means for determining whether or not said amount determining device shall or shall not operate the totalizer, said controlling means including two coacting members one of which is a cam having a dwell and inclines at each end of said dwell, whereby there is delimited a zone throughout the extent of which the condition determined by said controlling means persists, one of said two coacting members being supported upon said traveling element and being adjustable thereon to acting and to nonacting position.

145. In a calculating machine a totalizer, mechanism for operating said totalizer digitally and controlling means for determining whether or not said mechanism shall operate or not operate the totalizer, said controlling means including two coacting members one of which is a cam having a dwell and inclines at each end of said dwell, whereby there is determined a zone throughout the extent of which the condition determined by said controlling means persists.

146. In combination, a totalizer, an amount determining device adapted to operate the totalizer digitally, controlling means for determining whether or not said amount determining device shall or shall not operate the totalizer, said controlling means including two coacting members one of which is a cam having a dwell and inclines at each end of said dwell, the length of the dwell delimiting a zone throughout the extent of which the operative or nonoperative relationship between the totalizer and the amount determining device continues without change, and printing mechanism adapted to print numbers at different zones on the work sheet, one zone corresponding to the zone delimited by the dwell on the cam.

147. A totalizer, an amount determining device provided with engaging mechanism adapted to engage the totalizer to operate it digitally, and determining mechanism including a traveling member and means coacting with said traveling member and controlling said engaging mechanism to thereby determine automatically whether said engaging mechanism shall or shall not move digitally, the traveling member and its coacting means being shaped to cause a plurality of coactions during the travel in one direction of said traveling member.

148. A totalizer, an amount determining device provided with toothed gears adapted to engage the totalizer to operate it digitally, and determining mechanism including a traveling member and means coacting with said traveling member and controlling said gears to thereby determine automatically whether said gears shall or shall not move digitally, the traveling member and its coacting means being shaped to cause a plurality of coactions during the travel in one direction of said traveling member.

149. A totalizer, an amount determining device provided with gear wheels adapted to engage the totalizer to operate it digitally, and determining mechanism including a traveling member and means coacting with said traveling member and controlling said wheels to thereby determine whether said wheels shall or shall not move digitally, the traveling member and its coacting means being shaped to cause a plurality of coactions during the travel in one direction of said traveling member.

150. In a calculating machine, two setting wheels, keys for operating both setting wheels simultaneously and a totalizer adapted to engage each of said setting wheels, said setting wheels always remaining a fixed distance apart except for a variation of a fraction of a decimal space.

151. In a calculating machine, multi-decimal totalizing mechanism, two master wheels for operating the same and means for moving said master wheels equal amounts in opposite directions simultaneously.

152. In a calculating machine, totalizing mechanism, two setting wheels for operating the same, means for operating said setting wheels, and automatic means for connecting or disconnecting one of said setting wheels and said operating means.

153. In a calculating machine, totalizing mechanism, two setting wheels for operating the same, means for operating said setting wheels, and manual means for connecting or disconnecting one of said setting wheels and said operating means.

154. In a calculating machine, totalizing mechanism, two master wheels for operating the same, means for rotating the master wheels equal amounts simultaneously, and means common to both master wheels for reversing their directions of rotation simultaneously.

155. In a calculating machine, the combination of two reversible receiving mechanisms and two setting members, one for each receiving mechanism, said setting members being adapted to operate said receiving mechanisms simultaneously equal amounts in opposite directions, and means for simultaneously reversing the direction of rotation of said setting members.

156. In a calculating machine the combination of a plurality of reversible receiving mechanisms each embodying tens carrying mechanism, a plurality of setting wheels for operating said receiving mechanisms simultaneously in the same decimal columns of the respective receiving mechanisms and means for reversing at will, the direction of operation of said setting wheels.

157. In a recording calculating machine the combination of figure keys, printing mechanism operated thereby, a plurality of reversible receiving mechanisms each embodying tens carrying mechanism and a plurality of setting wheels operated by the same set of figure keys, said setting wheels being reversible and adapted to operate said receiving mechanisms simultaneously in the same decimal columns of the respective receiving mechanisms.

158. In a calculating machine the combination of a main setting wheel, an auxiliary setting wheel, a plurality of reversible receiving mechanisms each embodying tens carrying mechanism and adapted to be operated by one of said setting wheels while the other of said receiving mechanisms is being operated by the other, and means for reversing the direction of rotation of said setting wheels at will.

159. In a calculating machine the combination of two reversible receiving mechanisms each embodying tens carrying mechanism and setting mechanism adapted to operate one of said receiving mechanisms additively and the other substractively simultaneously in the same decimal columns of said receiving mechanisms, keys for operating said receiving mechanisms, said setting mechanisms being reversible whereby a number may be introduced additively in one receiving mechanism and simultaneously subtractively in the other or subtractively in the first receiving mechanism and simultaneously additively in the other to thereby correct a wrong number inserted in said receiving mechanisms.

160. In a calculating machine the combination of two reversible receiving mechanisms, each embodying tens carrying mechanism and setting mechanism adapted to operate one of said receiving mechanisms additively and the other subtractively simultaneously in the same decimal columns of the said receiving mechanisms, said setting mechanisms being reversible whereby a number may be introduced additively in one receiving mechanism and simultaneously subtractively in the other, or subtractively in the first receiving mechanism and simultaneously additively in the other.

161. In a calculating machine, a totalizer, and two setting wheels each adapted to engage said totalizer in every decimal place thereof.

162. In a calculating machine, reversible totalizing mechanism, means for operating the same, a traveling member and a part cooperating therewith for automatically determining the connection or disconnection of the totalizer and its operating means, and manual mechanism for reversing the direction of operation of the totalizing mechanism.

163. In a calculating machine, reversible totalizing mechanism, means for operating the same, a traveling member and a part cooperating therewith for automatically determining the connection or disconnection of the totalizer and its operating means, and manual mechanism for disconnecting the operating mechanism and the totalizer.

164. In a calculating machine, the combination of a reversible totalizer, reversible means for operating the same, means for printing numbers in horizontal arrangement, mechanism for operating the printing means and the totalizer operating means simultaneously, and manual mechanism for reversing the direction of operation of the totalizer operating means.

165. In a calculating machine, the combination of a reversible totalizer, reversible means for operating the same, means for printing numbers in horizontal arrangement, mechanism for operating the printing means and the totalizer operating means simultaneously, and manual mechanisms for disconnecting the totalizer and its operating means.

166. In a calculating machine, reversible totalizing mechanism, reversible operating mechanism therefor, means for printing numbers in horizontal arrangement, and means for operating both the printing means and the totalizer simultaneously, whereby numbers may be added and subtracted and simultaneously printed in horizontal arrangement.

167. In a calculating machine the combination of a plurality of setting wheels, a totalizer, and means for bringing said totalizer into engagement with one of said setting wheels after the other.

168. In a calculating machine, the combination of a plurality of setting wheels, a totalizer, means for bringing said totalizer into engagement with one of said setting wheels after the other, and printing mechanism adapted to print the numbers inserted into said totalizer by said setting wheels.

169. In a calculating machine, the combination of a plurality of setting wheels, a totalizer, means for bringing said totalizer into engagement with one of said setting wheels after the other, printing mechanism adapted to print the numbers inserted into said totalizer by said setting wheels, and means common to said setting wheels and said printing mechanism for operating them.

170. In a recording calculating machine the combination of a receiving mechanism, means for setting up a number thereon and simultaneously printing in one column and for setting up another number thereon and simultaneously printing in another column, and mechanism for reversing the setting means whereby numbers may be added and subtracted horizontally.

171. In a recording calculating machine, a traveling carriage to determine the printing place, a receiving mechanism, master mechanism for operating said receiving mechanism, means for connecting the master mechanism to the receiving mechanism for recording in one column and for again connecting the master mechanism and receiving mechanism for recording in another column, and means for reversing the master mechanism, whereby numbers printed in a horizontal line may be added and subtracted.

172. In a calculating machine the combination of a totalizer, key actuated differential mechanism and a plurality of totalizer actuating mechanisms operated by said differential mechanism, said totalizer being adapted to be actuated by either of said actuating mechanisms.

173. In a calculating machine the combination of a totalizer, number inserting means therefor, adapted to insert numbers therein, either positively or negatively, a traveling member and automatic mechanism whose position is determined by said traveling member to reverse the operation of the number inserting mechanism on said totalizer as a consequence of the motion of said traveling member.

174. In a calculating machine, a totalizer adapted to both add and subtract, mechanism for operating said totalizer digitally and controlling means including two coacting members one of which automatically moves relatively to the other and whose position in said motion determines that said mechanism shall operate said totalizer to subtract.

175. In a calculating machine, a totalizer adapted to add and subtract, mechanism for operating said totalizer digitally and controlling means including two coacting members one of which moves relatively to the other in a definite path and is automatic in its movement in said path, said moving coacting member automatically determining whether the number shall be operated additively or subtractively depending upon the position of the said moving member in its said path.

176. In a calculating machine, a totalizer adapted to both add and subtract, mechanism for operating said totalizer digitally, and controlling means for automatically determining when said mechanism shall operate said totalizer to subtract, said controlling means including two coacting members one of which automatically moves relatively to the other during the operation of the machine.

177. In a calculating machine the combination of a totalizer, means for inserting numbers therein either positively or negatively, printing mechanism, a work sheet, automatic mechanism determining that a number printed in one location on the work sheet shall enter the totalizer positively and a number printed in a second location shall enter the totalizer negatively.

178. In a calculating machine, the combination of two multidecimal totalizers, one of said totalizers being reversible, and means for operating the two totalizers simultaneously.

179. In a calculating machine, the combination of two multi-decimal totalizers, one of said totalizers being reversible, means for entering the same number in both totalizers simultaneously, and means for reversing the operation of the operating means upon said reversible totalizer.

180. In a calculating machine, the combination of a plurality of receiving mechanisms, each embodying tens carrying mechanism, one of said receiving mechanisms being reversible whereby it may be operated additively or subtractively, a plurality of setting wheels for operating said receiving mechanisms simultaneously in the same decimal columns of the respective receiving mechanisms, and means for reversing the direction of rotation of one of said setting wheels.

181. In a recording calculating machine, the combination of printing mechanism, two receiving mechanisms each embodying tens carrying mechanism, one of said receiving mechanisms being reversible, actuating means common to both the receiving mechanisms and the printing mechanism for operating them, and means for reversing the operation of said actuating means upon the reversible receiving mechanism.

182. In a calculating machine, the combination of two multidecimal totalizers, mechanism for simultaneously entering a number in both of said totalizers and means to reverse the action of a number entering mechanism on only one of said totalizers.

183. In a calculating machine, the combination of two multidecimal totalizers, one of which is reversible, mechanism for simultaneously entering a number in both totalizers and means to reverse the action of said number entering mechanism on the reversible totalizer.

184. In a calculating machine, the combination of a plurality of reversible receiving mechanisms each embodying tens carrying mechanism, a plurality of setting wheels for operating said receiving mechanisms simultaneously in the same decimal columns of the respective receiving mechanisms, and means for reversing the direction of rotation of both setting wheels simultaneously.

185. A combination of two multidecimal totalizers and mechanism for operating them both simultaneously, said totalizers both being reversible whereby errors may be corrected.

186. In a calculating machine, the combination of two multidecimal reversible totalizers, and mechanism for inserting a number simultaneously in both totalizers in either direction.

187. In a calculating machine, the combination of two multidecimal totalizers and means for operating both totalizers, said means including keys and connections to operate both totalizers such that the numerical values upon both totalizers are simultaneously decreased by the same amount according to the numerical values of the keys operated.

188. In a calculating machine, the combination of two reversible receiving mechanisms each embodying tens carrying mechanism and means common to both for operating one of said receiving mechanisms in its 0 to 1 direction and the other simultaneously in its 1 to 0 direction.

189. In a calculating machine, the combination of two reversible receiving mechanisms each embodying tens carrying mechanism and means common to both for operating one of said receiving mechanism in its 0 to 1 direction and the other an equal amount simultaneously in its 1 to 0 direction.

190. In a calculating machine, the combination of two carrying wheels; a carrying tooth associated with each carrying wheel; carryable mechanism coöperating with said carrying teeth, the 0 position of each carrying wheel being determined by its associated carrying tooth being adjacent to the carryable mechanism and the 1 position of each carrying wheel being determined by the position it occupies after having been moved one step away from the 0 position in the direction moving its carrying tooth away from the carryable mechanism; and gear connections between the two carrying wheels moving them equal amounts, one carrying wheel in its own 0 to 1 direction, the other in its own 1 to 0 direction.

191. In a calculating machine, the combination of mechanism adapted to be brought to various positions to represent the various digital values both positive and negative, said mechanism being adapted to be rotated in one direction to be brought to zero from a positive digital value, and being adapted to be rotated in the opposite direction to be brought to zero from a negative digital value; at least one carrying tooth rotating with said mechanism; and at least one coöperating tooth adapted to be moved by a carrying tooth; said rotatable mechanism when brought to zero by rotation in either direction bringing a carrying tooth up to a coöperating tooth without moving the latter.

192. In a calculating machine, the combination of mechanism adapted to be brought to various positions to represent the various digital values both positive and negative, said mechanism being adapted to be rotated in one direction to be brought to zero from a positive digital value, and being adapted to be rotated in the opposite direction to be brought to zero from a negative digital value; at least one carrying tooth rotating with said mechanism; and at least one carrying pinion tooth adapted to be moved by a carrying tooth; said rotatable mechanism when brought to zero by rotation in either direction bringing a carrying tooth up to a carrying pinion tooth without moving the latter.

193. In a calculating machine, the combination of mechanism bearing two groups of digits, each group being composed of the digits 0, 1, 2, 3, 4, 5, etc., an operation of the mechanism causing the digits of one group to increase progressively and at the same time the digits of the other group to decrease progressively, and the 0 of each group being capable of being brought to the reading line of said group; a carrying tooth associated with each 0 and supported by said mechanism; and a drivable tooth associated with each carrying tooth and drivable thereby; the parts being so dimensioned for both 0's that when a 0 is at its reading line its associated carrying tooth is adjacent to its coöperating drivable tooth, and when the mechanism is moved one step to change the 0 at the reading line into a 1, said carrying tooth moves away from said drivable tooth.

194. In a calculating machine, the combination of a plurality of multidecimal reversible receiving mechanisms each embodying tens carrying mechanism, means for operating them simultaneously and in unison in one direction, and means for operating said receiving mechanisms simultaneously and in unison in the opposite direction.

195. In a calculating machine, the combination of a plurality of reversible totalizers, means common to both for operating the first totalizer positively and the second totalizer at the same time negatively and means for reversing the totalizer operating mechanism to thereby operate the first totalizer negatively and the second at the same time positively.

196. In a calculating machine the combination of a plurality of multidecimal reversible receiving mechanisms each embodying tens carrying mechanism, a plurality of setting wheels for operating said receiving mechanism simultaneously in the same decimal columns of the respective receiving mechanisms, and means for reversing the plurality of setting wheels simultaneously.

197. In a calculating machine, the combination of a plurality of totalizers each embodying a set of carrying mechanisms, means for operating said totalizers simultaneously, and means for reversing the direction of operation of the totalizers at will.

198. In a calculating machine, the combination of a plurality of multi-decimal totalizers each embodying a set of reversible carrying mechanisms, means for operating said totalizers simultaneously, and means for reversing the direction of operation of said totalizers.

199. In a calculating machine, the combination of a plurality of multidecimal totalizers, each embodying reversible carrying mechanism, means for operating said totalizers simultaneously, said totalizers and operating means traveling relatively to each other whereby a number is inserted into the totalizers digit by digit, and manually operated means for reversing the direction of operation of the totalizers.

200. In a calculating machine, the combination of a plurality of totalizers each embodying reversible figure wheels and carrying mechanism for operating the same, actuating mechanism adapted to operate said totalizer simultaneously in the same decimal columns, the totalizers and actuating mechanism traveling relatively to each other, manually operated means for reversing the direction of operation of the totalizers and figure keys adapted to operate said totalizers, actuating means and said printing mechanism.

201. In a calculating machine, the combination of two totalizers, means for operating both totalizers simultaneously each in a given direction to register a number, and means for reversing both totalizers whereby they can be operated simultaneously to register a number and each in a direction opposite to that in which it was operated before.

202. In a calculating machine, two totalizers, an amount determining device, two separate means for transmitting the amount from the amount determining device into the said totalizers and mechanism for bringing one of the transmitting means to rest digitally without affecting the other.

203. In a calculating machine, the combination of a traveling carriage, two totalizers, means for inserting numbers into said totalizers simultaneously digit by digit in accordance with the movement of the carriage and means for disconnecting each of said totalizers from said number inserting means independently of the other totalizer and independently of the position of the carriage.

204. In a calculating machine, the combination of two multi-decimal totalizers; means connecting said two totalizers for transferring an amount from the first of said totalizers to the second, said means including mechanism for bringing one of said totalizers to zero; and a traveling member rendering said connecting means operative at a predetermined position of its travel.

205. In a calculating machine, the combination of two totalizers, a set of digit keys, mechanism operated by said keys for actuating said totalizers digitally, a traveling carriage and automatic means to determine that the actuation of a key of said set shall transfer a number from the first of said totalizers into the second of said totalizers, said automatic means being controlled by the position of the carriage.

206. In a calculating machine, the combination of two multi-decimal totalizers; and means connecting said totalizers for transferring the amount from the first of said totalizers to the second, said means including mechanism for bringing one of said totalizers to zero.

207. In a calculating machine, the combination of two multi-decimal totalizers and mechanism driving both to the same extent, said mechanism bringing one of said totalizers to zero and thereby transferring the amount previously in said totalizer into the other totalizer.

208. In a calculating machine, the combination of two totalizers one of them traveling, means for inserting numbers in both simultaneously and means for automatically disconnecting one of said totalizers independently of the other from said number inserting means at a predetermined point of the travel of the totalizers.

209. In a calculating machine, the combination of two traveling totalizers, means for inserting numbers in said totalizers simultaneously digit by digit in accordance with the travel of the totalizer, and means for disconnecting said totalizers independently of each other from said number inserting means.

210. In a calculating machine, the combination of two traveling totalizers, means for inserting numbers in said totalizers simultaneously and means for automatically disconnecting one of said totalizers independently of the other from said number inserting means at a predetermined point of the travel.

211. In a calculating machine, the combination of two totalizers, means for connecting them to operate them simultaneously in opposite directions to enter numbers therein, and a traveling member traveling as an incident to the operation of the entering of the numbers, said traveling member being operative in at least one position of its travel to render said connecting mechanism active.

212. In a calculating machine, the combination of a traveling carriage having calculating mechanism mounted thereon, a set of numeral keys, means driven by said numeral keys to enter numbers in said calculating mechanism and a lock to prevent traveling movement between the calculating mechanism and said actuating mechanism while a key is depressed, said lock being adapted to be rendered effective at a certain point on the down stroke of the key and to be released before said key arrives at said locking point on its up stroke.

213. A calculating machine having mechanism adapted to add and subtract any desired set of numbers within the capacity of the machine, said mechanism exhibiting the correct numerical value of the total whether the same be positive or negative and said mechanism also indicating whether said total is positive or negative.

214. In a calculating machine, mechanism adapted to add and subtract, said mechanism exhibiting the correct numerical value of the total whether the same be positive or negative, said mechanism also indicating whether said total is positive or negative, and master means for operating said mechanism one decimal place at a time.

215. In a calculating machine, reversible mechanism adapted to add and subtract any desired set of numbers within the capacity of the machine, figure wheels operated by said mechanism to exhibit the correct numerical value of the total whether the same be positive or negative, and means for indicating whether said total is positive or negative.

216. A calculating machine having a plurality of number wheels, said plurality bearing two decimal sets of figures, there being for each decimal place two series of digits running from 0 to 9 inclusive, reversible carrying mechanism operatively connected with said number wheels, and reversible actuating mechanism for operating said number wheels.

217. In a calculating machine, mechanism having two sets of digits and differential means operating thereon to cause one set of digits to increase while the other set decreases and manually operated means for reversing the direction of operation of said differential means.

218. A calculating machine having a plurality of number wheels, said plurality bearing two decimal sets of figures, there being for each decimal place two series of digits running from 0 to 9 inclusive, reversible carrying mechanism operatively connected with said number wheels, and reversible actuating mechanism for operating said number wheels digit by digit.

219. In a calculating machine the combination of two reversible receiving mechanisms each embodying ten carrying mechanism and two setting members, one for each receiving mechanism, said setting members being adapted to operate one of said receiving mechanisms subtractively and the other additively simultaneously in the same decimal columns of the respective receiving mechanisms and said setting members being reversible whereby they may produce either addition or subtraction in either of said receiving mechanisms and thus cause the machine always to give the algebraic total of the items inserted thereinto.

220. In a calculating machine, the combination of two reversible receiving mechanisms, each provided with figure wheels, and each embodying ten carrying mechanism; and setting mechanism adapted to operate one of said receiving mechanisms additively and the other subtractively in the same decimal columns of said receiving mechanisms, said setting mechanisms being reversible whereby a number is introduced additively in one receiving mechanism and simultaneously subtractively in the other, or subtractively in the first receiving mechanism and simultaneously additively in the other to thereby obtain the correct total of the positive and negative numbers introduced into each totalizer.

221. In a calculating machine, the combination of two reversible receiving mechanisms, each embodying a plurality of ten carrying mechanism; setting mechanism adapted to operate one of said receiving mechanisms additively and the other subtractively in the same decimal columns of said receiving mechanisms; keys for operating said setting mechanism; and reversing means to reverse the direction of motion of said setting mechanism to thereby introduce a number by the keys either positively or negatively at will, whereby a number introduced by the keys enters one receiving mechanism additively and the other subtractively or at will enters the first receiving mechanism subtractively and the second additively whereby said receiving mechanisms produce the correct total of the additive and subtractive numbers introduced by the keys and the carrying mechanism in the highest decimal place determines whether said total is positive or negative.

222. In a calculating machine, the combination of mechanism for obtaining the difference between two numbers and means for operating said mechanism once for each of said numbers to obtain said difference, said difference being exhibited in one predetermined locality in case the first number is larger than the second, and being exhibited in another predetermined locality in case the first number is smaller than the second.

223. In a calculating machine, mechanism for obtaining the difference between two numbers, each of which has a plurality of digits, and means including keys for inserting said two numbers thereinto, said difference being exhibited in one predetermined locality in case the first number is larger than the second and being exhibited in another predetermined locality if the first number is smaller than the second.

224. In a calculating machine, the combination of totalizing mechanism adapted to be actuated in one direction to add and in the reverse direction to subtract, and actuating means therefor, said totalizing mechanism being adapted to indicate the difference between any two amounts whether said difference be a positive or a negative quantity.

225. A calculating machine having mechanism adapted to calculate both positive and negative totals of any desired set of numbers within the capacity of the machine by an actuation of said mechanism once for each of said numbers and having carrying wheels adapted to be brought back to zero, the carrying wheels when brought back to zero from a positive total exhibiting 000 at a predetermined location, and when brought back to zero from a negative total exhibiting 000 at another predetermined location.

226. In a calculating machine, mechanism having decimal members adapted to be displaced to represent a number and the complement thereof, an amount determining device, and means operated as a result of a single actuation of said amount determining device for displacing said members to represent both the number and its true arithmetical complement.

227. In a calculating machine, mechanism having decimal members adapted to be displaced to represent a number and the complement thereof, digit keys, and means operated as a result of a single actuation of said keys for displacing said members to represent both the number and its true arithmetical complement.

228. In a recording calculating machine, a plurality of decimal members capable of being displaced to represent numbers and mechanism operating said decimal members and adapted to print the total, said operating mechanism in consequence of a complete operation thereof to print said total, replacing into their zero positions decimal members of said plurality displaced to represent the arithmetical complement of the total and also replacing into their zero positions decimal members of said plurality displaced to represent the total itself.

229. In a calculating machine, totalizing mechanism having two sets of carrying wheels, each carrying wheel being supplied with a carrying tooth, gearing connecting the two carrying wheels of the same decimal place to thereby move them both an equal amount in opposite directions, each of said carrying wheels being rotated in one direction for the insertion of a positive number and being rotated in the opposite direction for the insertion of a negative number, and mechanism coöperating with the carrying teeth, the 0 position of the totalizing mechanism for a positive number being determined by the contact of the carrying teeth upon one set of wheels with the coöperating mechanism and the zero position for a negative number being determined by the contact of the carrying teeth upon the other set with the coöperating mechanism.

230. Two totalizers, two master wheels for operating the totalizers digit by digit, a traveling carriage for supporting paper, type bars, digit keys operating the type bars and simultaneously determining the number entering within the totalizer, mechanism for disconnecting either of the totalizers or both of them from the keys at the choice of the operator, means for the operation upon either or both totalizers at the will of the operator and an escapement mechanism operating to move the carriage at each operation of the key.

231. In combination, a receiving mechanism and operating means therefor, including a driving connection for operating the receiving mechanism, the receiving mechanism and operating means being relatively movable axially, a cam device carried by the receiving mechanism and a coöperating part relatively fixed axially with respect to said driving connection, the cam device being adapted to assume two positions, in only one of which will it engage the coöperating part to operate the same to establish a positive interlocking engagement of the driving connection with the receiving mechanism.

232. In combination, a totalizer, two oppositely rotating setting wheels located at a distance apart greater than the width of the totalizer, and means for bringing the totalizer into engagement with first one and then the other of said setting wheels.

233. In a calculating machine, the combination of a reversible totalizer, key mechanism for operating it either additively or subtractively at will and a full stroke mechanism coöperating with said key mechanism.

234. In a calculating machine, the combination of a totalizer, a master member for driving it, key mechanism for driving the master member, said master member being positively connected to the driving key during the driving stroke thereof and a full stroke mechanism coöperating with the driving key during the driving stroke thereof.

235. In a calculating machine, the combination of indicating mechanism adapted for travel, a supporting frame for said indicating mechanism, numeral keys, driving mechanism associated with said numeral keys, the actuation of any key causing the indicating mechanism to be driven to perform calculation, means for rigidly locking the indicating mechanism against bodily movement while a key is being depressed and releasing said indicating mechanism when the key has reached the bottom of the same stroke.

236. In a calculating machine, the combination with a supporting frame, of escapement mechanism connected therewith, a totalizer secured to the supporting frame, keys, driving mechanism associated with said keys, depression of a key causing actuation of the driving mechanism to cause the engaged totalizer mechanism to perform calculation, and means for rigidly locking the supporting frame against escapement during the depression of the key, said locking means being inoperative during the upstroke of the key.

237. In a calculating machine, the combination with a traveling totalizer frame, of escapement mechanism associated therewith, driving mechanism associated with keys of the machine and adapted upon actuation of a key to operate totalizer mechanism to perform calculations, and lever mechanism adapted upon actuation of a key to lock the totalizer frame to the stationary driving mechanism to prevent escapement of the totalizer frame during a calculation, release of the key after a calculation causing unlocking of the totalizer frame to allow escapement thereof.

238. In a calculating machine, the combination with a totalizer frame adapted to travel, of driving mechanism associated with keys of the machine and with the totalizer mechanism, actuation of a key causing the engaged totalizing mechanism to be actuated by the driving mechanism to perform a calculation, and means upon actuation of a key for locking the totalizer frame rigidly against bodily displacement before and during the time the totalizer mechanism is actuated to perform the calculation.

239. In a calculating device for attachment to a typewriting machine, the combination with a totalizer frame connected with the escapement carriage of the machine and comprised of a plurality of totalizer gears and accompanying mechanisms, driving mechanism associated with the keys of the machine and with the totalizer mechanism and adapted upon actuation of a key to cause actuation of the totalizer mechanism to perform a calculation, and lever mechanism associated with the keys for rigidly locking the totalizer frame to prevent escapement thereof and of the escapement carriage during the time that the totalizer mechanism is actuated to perform calculations.

240. In a calculating machine, the combination with totalizer mechanism comprising a row of totalizer gears and accompanying calculating mechanism, of a main driving wheel pivoted to the machine frame, driving mechanism for the main driving wheel associated with keys of the machine, escapement mechanism to move the totalizer mechanism to carry the totalizer gears successively into engagement with the main driving wheel, and means operated by the actuation of a key to lock the totalizer frame against escapement before and during the time that the totalizer mechanism is being actuated upon further depression of the key to perform a calculation, said locking means being inoperative after the key has reached the bottom of its stroke.

241. In calculating mechanism adapted for connection with a typewriting machine, the combination with a totalizer frame connected with the escapement carriage of the machine to travel horizontally with the escapement carriage across the machine, of a plurality of totalizer gear wheels disposed in a horizontal row within the totalizer frame, a main driving wheel pivoted to the machine frame and adapted for successive engagement with the totalizer gears as the totalizer frame is carried across the machine, driving mechanism for the main driving wheel associated with keys of the machine, actuation of a key causing rotation of the driving wheel to actuate the engaged totalizer gear to perform a calculation, and lever mechanism associated with the driving mechanism adapted at the beginning of the actuation of a key to be brought in position to securely lock the totalizer frame against escapement and to maintain such locking engagement until the end of the actuation of the engaged totalizer gear, release of the actuated key causing unlocking of the totalizer frame to allow escape thereof.

242. In calculating mechanism adapted for attachment to a typewriting machine, the combination with a totalizer frame connected with the escapement carriage of the machine to travel therewith across the machine, of a plurality of totalizer gears mounted in a horizontal row within the totalizer frame, a main driving gear pivoted to the machine frame, driving mechanism associated with keys of the machine for causing rotation of the main driving gear upon actuation of a key, said escapement mechanism of the machine tending to become effective when a certain point in the depressing stroke of a key is reached, and locking means independent of the escapement mechanism for locking the totalizer frame against escapement during the time that the main driving gear is actuated to rotate the engaged totalizer gear.

243. In a calculating machine, the combination with a totalizer frame comprising a plurality of totalizer gears mounted in a horizontal row, of escapement mechanism associated with the totalizer frame and with keys for the machine and adapted to cause successive advancement of the totalizer frame as the keys are depressed, a main driving gear pivoted to the machine frame adapted to mesh successively with the totalizer gears as the totalizer frame is carried by the escapement mechanism, driving mechanism connected between the keys and the main driving gear and adapted upon depression of a key to cause rotation of the main driving gear and of the totalizer gear wheel connected therewith, a plurality of slots cut in the totalizer frame, the spacing distance of the slots being equal to the escapement distance of the escapement mechanism, and a locking arm pivoted to the machine frame and adapted upon initial actuation of a key to be carried into engagement in one of said slots (before rotation of the driving gear upon further actuation of the key) and to be held in said slot while the main driving gear is being rotated to actuate the engaged totalizer gear, the escapement mechanism of the machine being thereby locked against actuation during the time a calculation is being performed by the totalizer mechanism.

244. In a calculating machine, the combination of a totalizer frame on which is mounted a plurality of totalizer gears arranged in a horizontal row and connected with associated calculating mechanism, means tending to move the totalizer frame across the machine, a main driving gear pivoted to the machine frame and adapted to mesh with the totalizer gears as the totalizer frame is moved, driving mechanism associated with keys of the machine and with the main driving gear and adapted upon actuation of a key to cause rotation of the engaged totalizer gear, and a locking arm pivoted to the machine frame and adapted upon initial actuation of a key to be carried into locking engagement with the totalizer frame to be held in such position until the engaged totalizer gear has been fully actuated, release of the actuated key causing said arm to be unlocked whereby the totalizer frame may be advanced.

245. In a calculating machine, the combination with a traveling totalizer frame, of totalizer mechanism within the frame, a main driving gear pivoted to the machine frame and adapted to mesh with totalizer gears upon travel of the totalizer frame, driving mechanism associated with said main driving wheel and with keys for the machine, locking means normally associated with the main driving gear to prevent displacement thereof, means upon initial actuation of a key for locking the totalizer frame against travel, means upon initial actuation of the key for releasing the locking means from the main driving wheel, means upon further actuation of the key for causing actuation of the driving mechanism to cause rotation of the released main driving gear and of the totalizer mechanism connected therewith, and means upon release of the key for causing the main driving wheel to be relocked and the totalizer frame to be unlocked.

246. In a calculating machine, the combination with a totalizer frame, of means tending to cause travel of the totalizer frame, a plurality of totalizer gears mounted in a horizontal row within the totalizer frame, a main driving wheel pivoted to the machine frame and adapted to mesh successively with the totalizer gears as the totalizer frame travels across the machine, driving mechanism associated with keys of the machine for causing rotation of the main driving gear, a locking lever normally locking the main driving gear against rotation, a second locking lever pivoted to the machine frame, means upon initial actuation of a key for first causing actuation of the second locking lever to lock the totalizer frame against travel, means for then causing release of the first locking lever from the main driving wheel to allow rotation thereof, means upon further actuation of the key for causing actuation of the driving mechanism to cause rotation of the released main driving gear whereby the engaged totalizer mechanism is actuated to perform a calculation, said second locking lever being held in locking position during rotation of the main driving wheel, and means upon release of the actuated key for causing relocking of the main driving wheel and unlocking of the totalizer frame whereby said frame may again travel.

247. In a calculating machine, the combination with a totalizer frame, of means for causing travel thereof across the machine, a plurality of totalizer gear wheels mounted in a row within the totalizer frame, driving mechanism associated with the totalizer mechanism and with keys for the machine, locking means normally preventing actuation of the driving mechanism, a locking lever normally allowing travel of the totalizer frame, means upon initial actuation of a key for first actuating the locking lever to lock the totalizer frame against travel and for then causing unlocking of the driving mechanism, means upon further actuation of the key for causing actuation of the driving mechanism to cause rotation of the engaged totalizer mechanism, and means after release of the actuated key for relocking the driving mechanism and for unlocking the totalizer frame to allow further travel thereafter.

248. In a calculating machine, the combination with a totalizer frame, of means for causing travel thereof, calculating and indicating mechanism mounted on said totalizer frame, driving mechanism pivoted to the machine frame and associated with keys of the machine, said driving mechanism being normally out of driving relation with the totalizer mechanism, locking means supported from the machine frame, means upon actuation of a key for causing said locking mechanism to securely lock the totalizer frame against travel, and means after locking of the totalizer for causing the driving mechanism to be brought into driving relation with the totalizer mechanism and then actuated to cause actuation of the totalizer mechanism.

249. In calculating mechanism for attachment to a typewriting machine, the combination with a totalizer frame connected with the escapement carriage of the machine to travel therewith, calculating mechanism mounted on the totalizer frame, driving mechanism associated with keys of the machine, means for normally retaining said driving mechanism out of driving relation with the totalizer mechanism, locking mechanism pivoted to the machine frame and associated with the keys, means upon initial actuation of a key for moving the locking mechanism to lock the totalizer frame against travel independently of the escapement mechanism of the machine, means for at the same time moving the driving mechanism into driving relation with the totalizing mechanism, means upon further actuation of the key for causing actuation of the driving mechanism to cause actuation of the totalizing mechanism, and means after actuation of the key for returning the driving mechanism and locking mechanism to their normal positions.

250. In a calculating device adapted for attachment to a typewriting machine, the combination with a totalizer frame connected with the escapement carriage of the machine to travel therewith, of driving mechanism supported from the machine frame and associated with the machine keys, a locking arm pivoted to the machine frame and connected with the machine keys, and teeth on the totalizer frame, actuation of a key causing first movement of a locking arm into engagement with the teeth to lock the totalizer frame against escapement independently of the escapement mechanism of the machine and then causing movement of the driving mechanism to operate the totalizer mechanism, said teeth and the end of said arm being beveled whereby the totalizer mechanism is drawn into proper alinement for engagement with the driving mechanism.

251. In a calculating machine, the combination with indicating mechanism mounted on a supporting frame adapted to move bodily, of driving mechanism mounted on the machine frame and connected with the keys of the machine, a locking arm pivoted to the machine frame and connected with the machine keys, and teeth on the indicating mechanism supporting frame, actuation of a key causing first movement of the arm into engagement with the teeth and then movement of the driving mechanism to actuate the indicating mechanism, said teeth and the end of said arm being beveled whereby upon engagement thereof said supporting frame will be drawn into proper position to carry the indicating mechanism into proper engagement with the driving mechanism.

252. In calculating mechanism for attachment to a typewriting machine, the combination with a totalizer frame secured to the escapement carriage of the machine and adapted to travel therewith, of driving mechanism mounted on the frame of the machine, a locking arm pivoted to the machine frame, and teeth cut in the totalizer frame in spacing corresponding to the escapement spacing of the machine, the machine number keys being connected with the driving mechanism and with said locking arm, actuation of a key causing first movement of the locking arm into engagement with the teeth to lock the totalizer frame and escapement carriage against escapement independently of the escapement mechanism of the machine, further actuation of the key then causing operation of the driving mechanism to actuate the totalizer mechanism, said teeth at the end of said locking arm being beveled whereby lost motion in the escapement carriage and totalizer frame is taken up and the totalizer parts brought into proper position for engagement with the driving mechanism.

253. The combination with a carriage, of an escapement therefor, keys, means operable at the end of the forward movement of a key for causing the escapement to operate, and means for locking the key against any subsequent forward movement from any intermediate point during its return movement.

254. The combination with a carriage, of an escapement therefor, keys, means operable at the end of the forward movement of a key for causing the escapement to operate, and means for preventing any subsequent operation of the escapement until the key has been fully restored to its normal position.

255. The combination with a carriage, of an escapement therefor, keys, and means for preventing any operation of the escapement upon actuation of a key unless the key is moved from the beginning to the end of its stroke.

256. In a calculating machine, the combination with indicating mechanism, of an escapement associated therewith, driving mechanism associated with keys for the machine and adapted for association with the indicating mechanism to cause calculations to be performed, and means for preventing any operation of the escapement while a calculation is being performed.

257. In a calculating machine, the combination with indicating mechanism, of driving mechanism, an escapement for causing relative movement between the indicating mechanism and the driving mechanism, said indicating mechanism being driven by the driving mechanism upon actuation of a key, and means for preventing any operation of the escapement while the indicating mechanism is being driven.

258. In a calculating machine, the combination with indicating mechanism, of driving mechanism for engagement therewith to cause operation thereof, a set of keys adapted to actuate said driving mechanism, escapement mechanism for bringing the indicating and driving mechanisms together, said set of keys also being operatively connected to said escapement mechanism, and auxiliary means for taking up lost motion between the mechanisms whereby said mechanisms are brought into exact engagement before operation thereof, said auxiliary means being brought into operation at the beginning of the downstroke of the key and being released on the completion of the downstroke of the key, whereby said escapement mechanism may function during the upstroke of the key.

259. The combination with driving mechanism, of indicating mechanism, an escapement for moving the driving and indicating mechanisms into engagement with each other, and auxiliary means for taking up lost motion between the mechanisms and to cause perfect alinement between the mechanisms before operation thereof.

260. The combination with a plurality of reversible computing devices each including a series of digit carriers, a plurality of numeral keys, digit printing mechanism, actuating means controlled by each of the keys for actuating any two corresponding carriers of said computing devices in unison, and means for establishing reversed relations between said keys and actuating means whereby a wrong insertion may be corrected.

261. In a calculating machine, the combination of a plurality of multi-decimal totalizers, each embodying reversible carrying mechanism, means for operating said totalizers simultaneously, said totalizers and operating means traveling relatively to each other whereby a number is inserted into the totalizers digit by digit, and manually controlled means for reversing the direction of operation of the totalizers.

262. In a calculating machine, the combination of a plurality of totalizers, each embodying reversible figure wheels and carrying mechanism for operating the same, actuating mechanism adapted to operate said totalizers simultaneously in the same decimal columns, the totalizers and actuating means traveling relatively to each other, manually-controlled means for reversing the direction of operation of the totalizers, printing mechanism, and figure keys adapted to control the operation of said totalizers, actuating means and said printing mechanism.

263. A calculating machine having a plurality of numeral wheels, and an operating mechanism therefor, said numeral wheels being rotatable in one direction to increase the accumulated total in adding and rotatable in the opposite direction to decrease the total in subtracting, with provisions for clearing from a negative total to zero by rotation of wheels one way and from a positive total to zero by rotation of wheels the opposite way.

264. In a calculating machine, the combination of two receiving mechanisms, each embodying ten carrying mechanism and two setting members, one for each receiving mechanism, said setting members being adapted to operate said receiving mechanisms simultaneously in the same decimal columns of the respective receiving mechanisms, and keys for operating both said setting members.

265. The combination of a plurality of totalizers, key-controlled means for accumulating numbers in one of said totalizers, and means also actuated by the said key-controlled means for transferring the number registered in one totalizer into another totalizer.

In witness whereof, I have hereunto subscribed my name in the presence of two witnesses.

HYMAN ELI GOLDBERG.

Witnesses:
A. W. MOORE,
J. I. MCDONALD.